United States Patent [19]

Kumagai et al.

[11] Patent Number: 5,273,597
[45] Date of Patent: Dec. 28, 1993

[54] TRIM MEMBER FOR MOTOR VEHICLE AND METHOD OF AND SYSTEM FOR MANUFACTURING THE SAME

[75] Inventors: Shuno Kumagai; Tamio Furuya; Eiji Tuyuki; Yoshitsugu Nishi; Nozomu Hama; Takaaki Sato; Akihiko Koshiro; Shingo Noguchi; Hitoshi Nakazawa, all of Sayama, Japan

[73] Assignee: Honda Giken Kogyo Kabushiki Kaisha, Tokyo, Japan

[21] Appl. No.: 982,045

[22] Filed: Nov. 25, 1992

Related U.S. Application Data

[63] Continuation of Ser. No. 440,245, Nov. 22, 1989, abandoned.

[30] Foreign Application Priority Data

Nov. 26, 1988 [JP] Japan ................. 63-299290
Dec. 5, 1988 [JP] Japan ................. 63-307550

[51] Int. Cl.$^5$ ................................................ B32B 5/20
[52] U.S. Cl. ..................................... 156/79; 156/245; 264/45.6; 264/46.7; 264/46.8; 264/240; 264/251
[58] Field of Search ............. 156/78, 79, 214, 215, 156/245; 264/45.1, 45.2, 45.6, 46.4, 46.6, 46.7, 46.8, 240, 251; 425/3, 403.1, 397, 398, 388, 817 R; 180/90; 280/752

[56] References Cited

U.S. PATENT DOCUMENTS

| | | |
|---|---|---|
| 3,042,137 | 7/1962 | Mathues et al. |
| 3,088,539 | 5/1963 | Mathues et al. |
| 3,112,987 | 12/1963 | Griffiths et al. ............... 264/46.7 |
| 3,248,758 | 5/1966 | Schmitz et al. ............. 425/DIG. 33 |
| 3,721,433 | 3/1973 | Sobel . |
| 3,793,415 | 2/1974 | Smith ........................ 264/46.4 |
| 3,912,036 | 10/1975 | Davis et al. .................... 180/90 |
| 3,922,429 | 11/1975 | Welch et al. ................. 428/308.4 |
| 4,002,520 | 1/1977 | Fenton ..................... 264/46.4 X |
| 4,297,308 | 10/1981 | Popplewell ................. 264/46.6 |
| 4,303,728 | 12/1981 | Houdek et al. ............... 264/46.8 |

(List continued on next page.)

FOREIGN PATENT DOCUMENTS

| | | |
|---|---|---|
| 0261760 | 3/1988 | European Pat. Off. |
| 0274535 | 7/1988 | European Pat. Off. |
| 3221614 | 8/1983 | Fed. Rep. of Germany . |
| 2486872 | 1/1982 | France . |
| 0058770 | 5/1979 | Japan ....................... 264/46.4 |
| 576499 | 4/1946 | United Kingdom . |
| 840394 | 7/1960 | United Kingdom . |
| 922349 | 3/1963 | United Kingdom . |
| 1129474 | 10/1968 | United Kingdom . |
| 1161228 | 8/1969 | United Kingdom . |
| 1189685 | 4/1970 | United Kingdom . |
| 1211944 | 11/1970 | United Kingdom . |
| 1263620 | 2/1972 | United Kingdom . |

(List continued on next page.)

OTHER PUBLICATIONS

Gruenwald, "Thermoforming-A Plastics Processing Guide", Technomic, 1987.

Primary Examiner—Michael W. Ball
Assistant Examiner—Francis J. Lorin

[57] ABSTRACT

A trim member for use as an interior furnishing in a motor vehicle includes a covering sheet including one surface having an embossed pattern, a first foamed body disposed on the other surface of the covering sheet, with a first component embedded partly in the first foamed body, and a second foamed body disposed on the other surface and/or the first foamed body, with a second component partly embedded in the second foamed body. The covering sheet, the first foamed body, and the second foamed body are integrally formed as a unitary construction. Since the trim member is constructed as an integral unitary assembly, it does not squeak while the motor vehicle is running, and does not have visible steps and joints on its outer surface.

8 Claims, 36 Drawing Sheets

U.S. PATENT DOCUMENTS

| | | | |
|---|---|---|---|
| 4,420,447 | 12/1983 | Nakashima | 425/817 R X |
| 4,462,786 | 7/1984 | Perryman | 425/388 |
| 4,482,180 | 11/1984 | Huber et al. | |
| 4,572,856 | 2/1986 | Gembinski | 428/71 |
| 4,673,542 | 6/1987 | Wigner et al. | 425/DIG. 33 |
| 4,766,025 | 8/1988 | Sanok et al. | 264/46.6 X |
| 4,806,094 | 2/1989 | Rhodes, Jr. et al. | 264/46.6 X |
| 4,873,036 | 10/1989 | Urai | 264/46.4 X |
| 4,923,539 | 5/1990 | Spengler et al. | 156/214 |
| 4,944,668 | 7/1990 | Asano et al. | 425/403.1 |
| 5,043,114 | 8/1991 | Saito et al. | 264/46.7 X |
| 5,047,184 | 9/1991 | Busch et al. | 264/46.6 |
| 5,104,596 | 4/1992 | Kargarzadeh et al. | 264/46.6 X |

FOREIGN PATENT DOCUMENTS

| | | |
|---|---|---|
| 1297871 | 11/1972 | United Kingdom . |
| 1521063 | 8/1974 | United Kingdom . |
| 1372752 | 11/1974 | United Kingdom . |
| 1558249 | 12/1979 | United Kingdom . |
| 1567982 | 5/1980 | United Kingdom . |
| 2039716A | 8/1980 | United Kingdom . |
| 2047612 | 12/1980 | United Kingdom . |
| 2081173A | 2/1982 | United Kingdom . |
| 2101927 | 1/1983 | United Kingdom . |
| 2107636A | 5/1983 | United Kingdom . |
| 2115753 | 9/1983 | United Kingdom . |
| 2167340A | 5/1986 | United Kingdom . |
| 2221865 | 2/1990 | United Kingdom . |

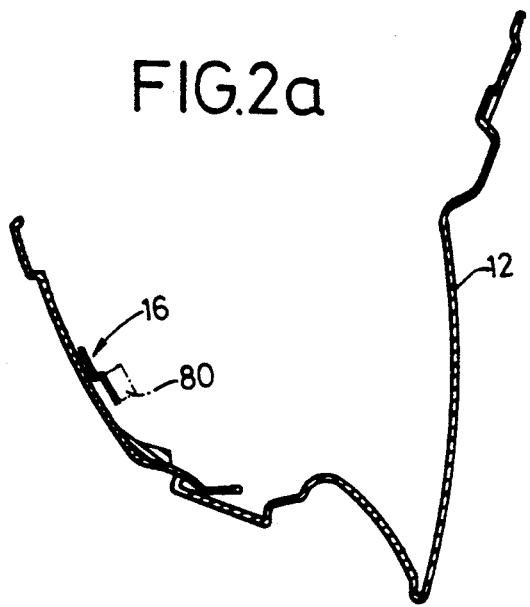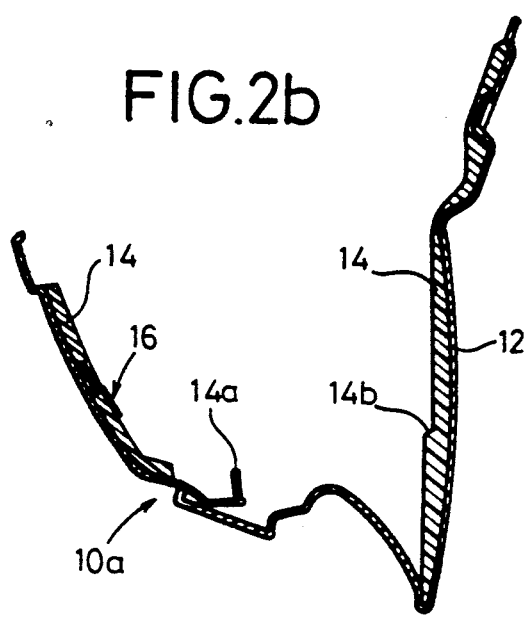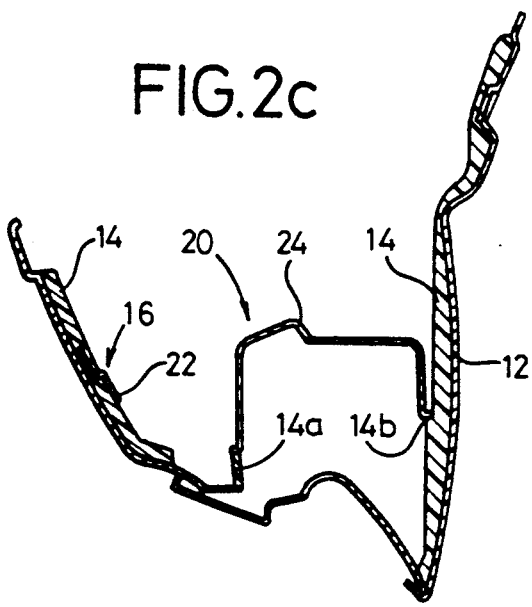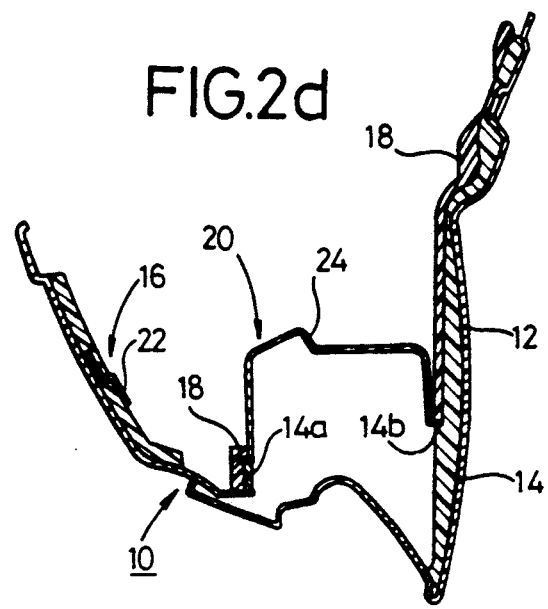

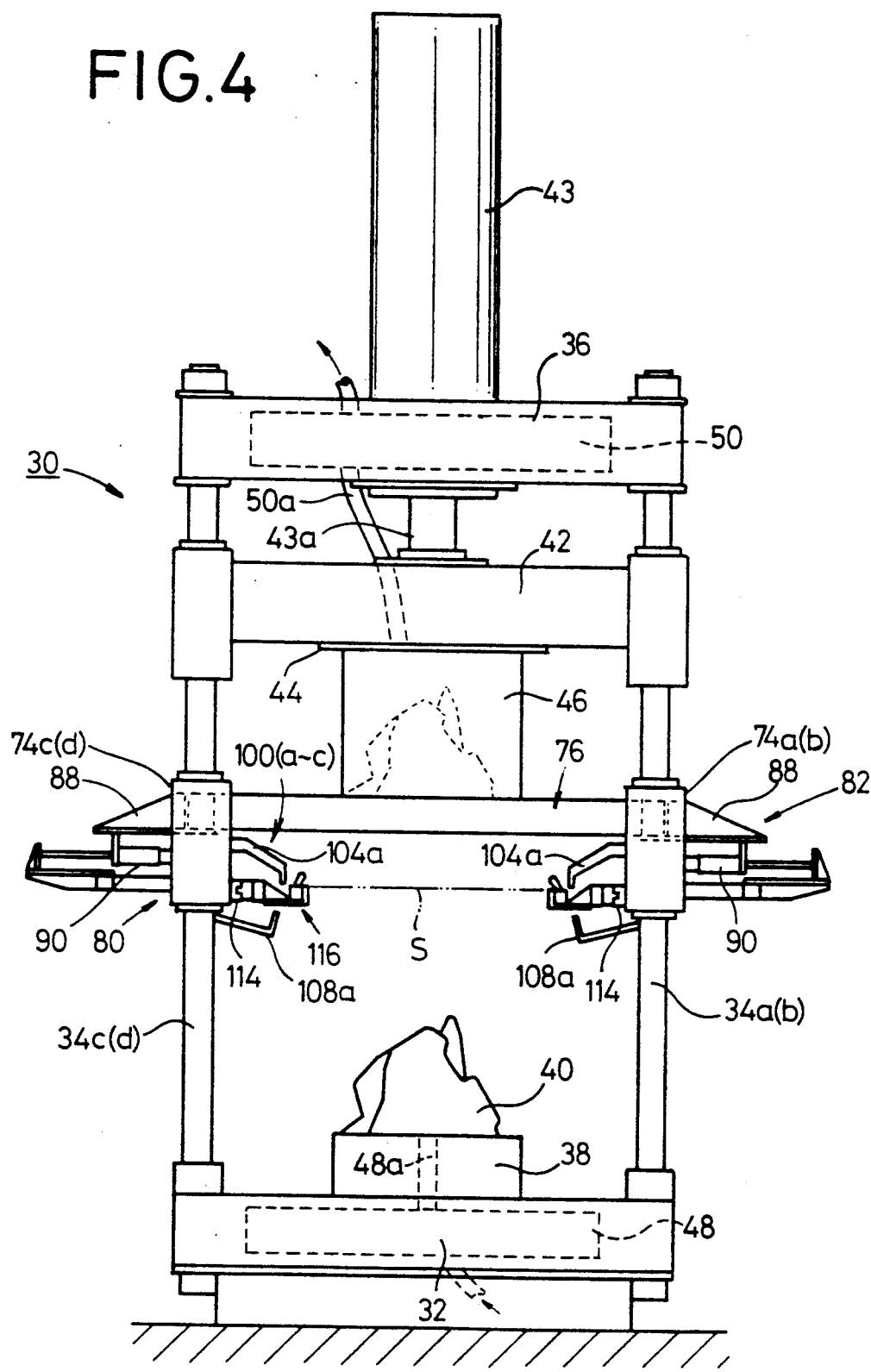

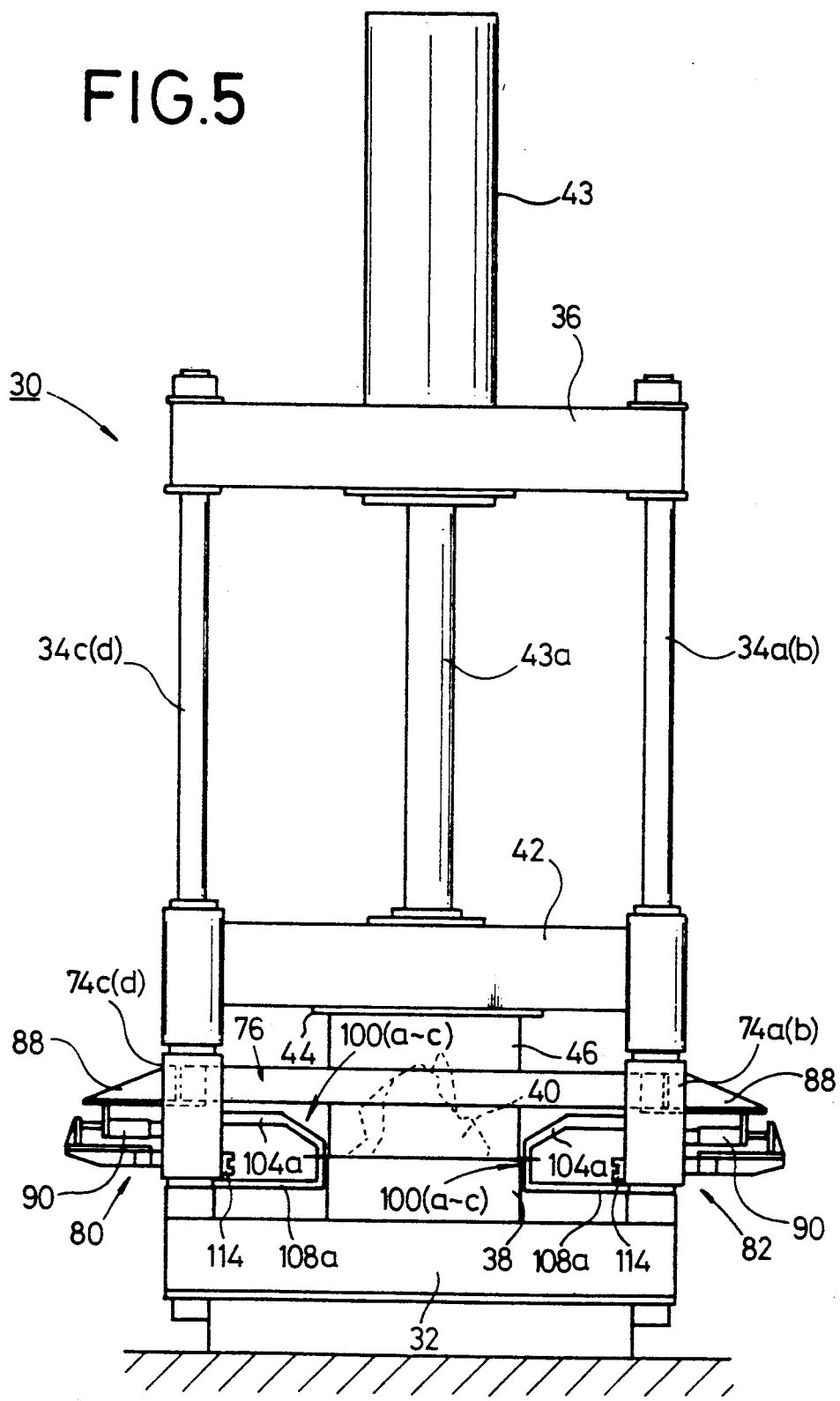

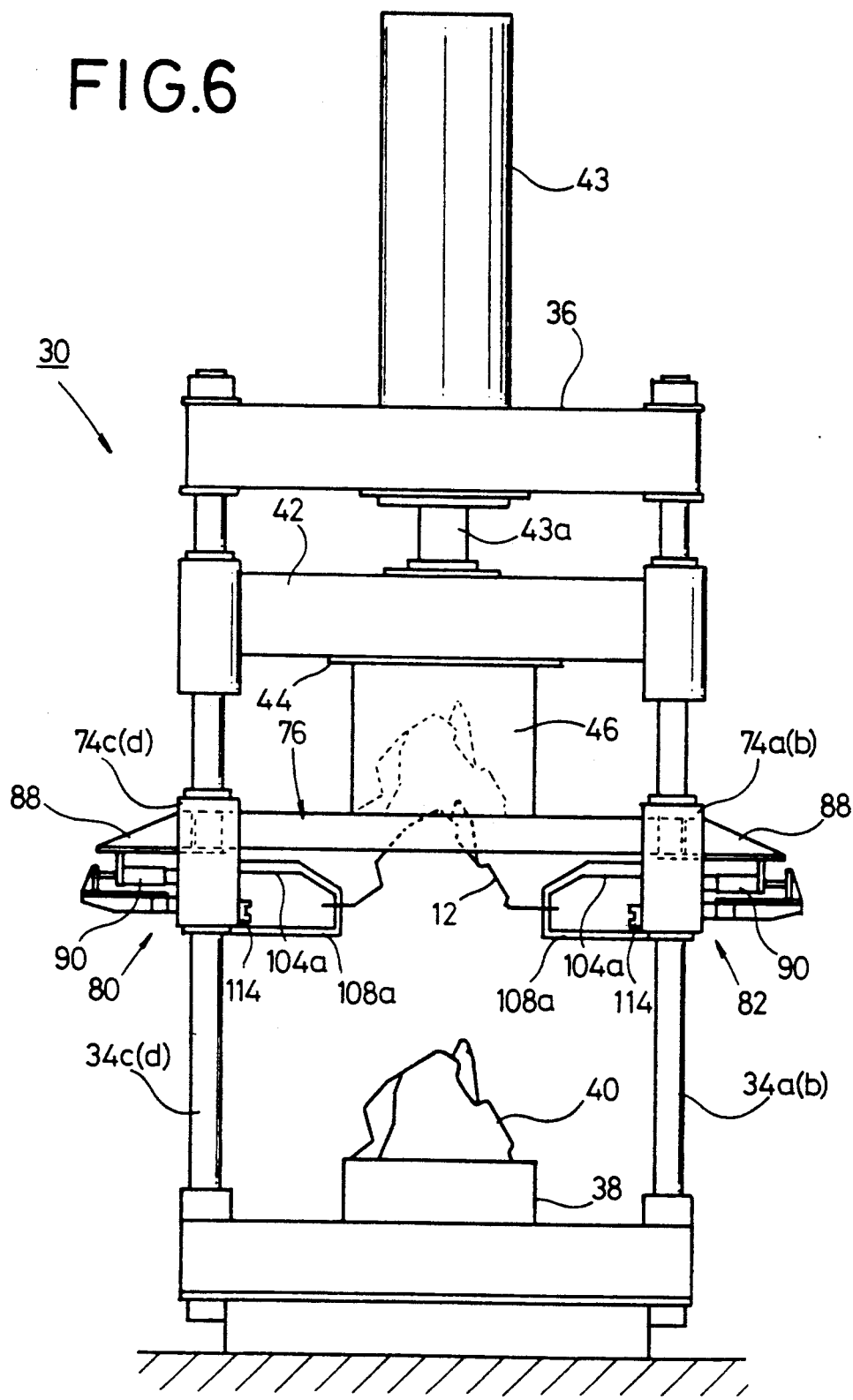

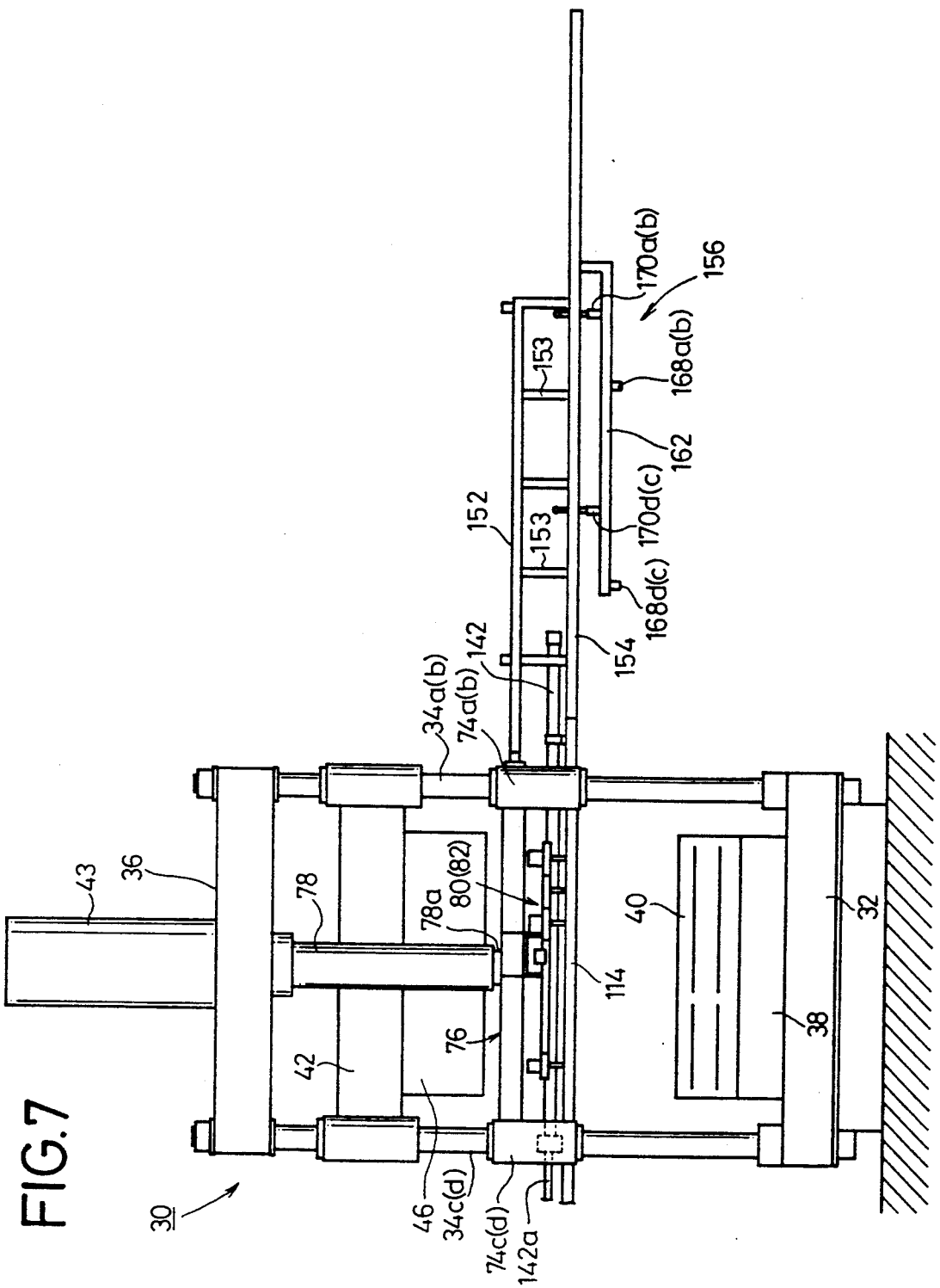

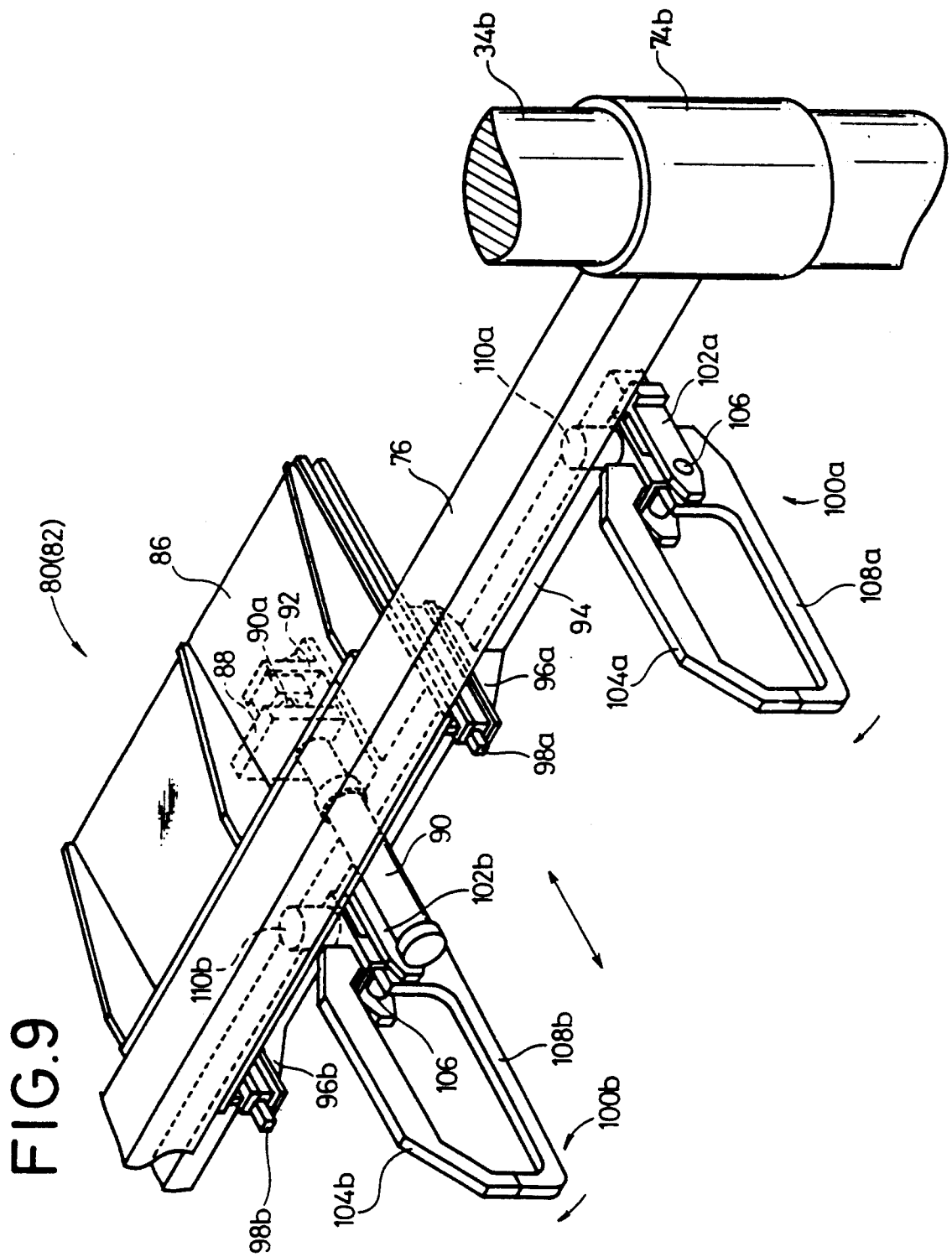

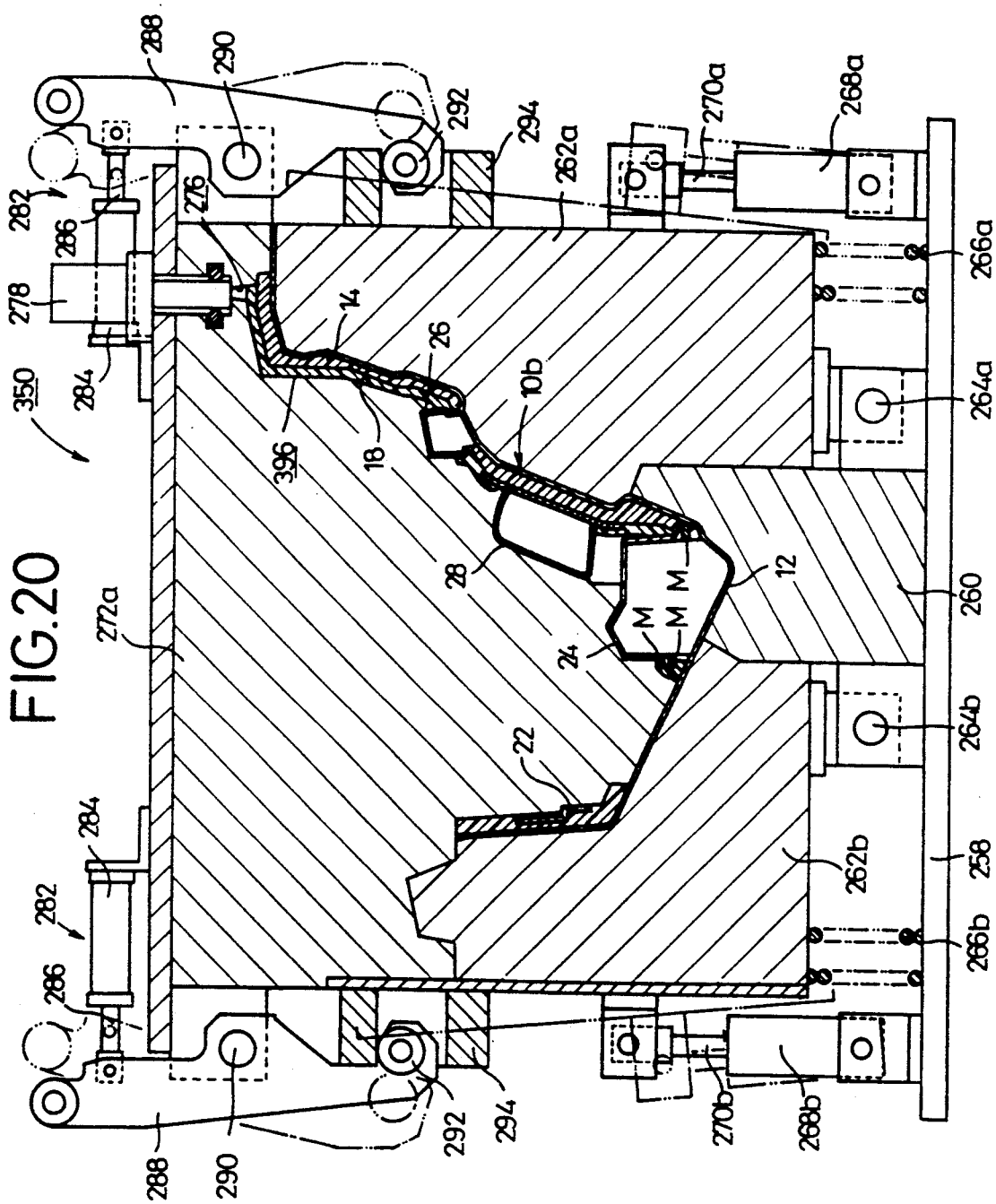

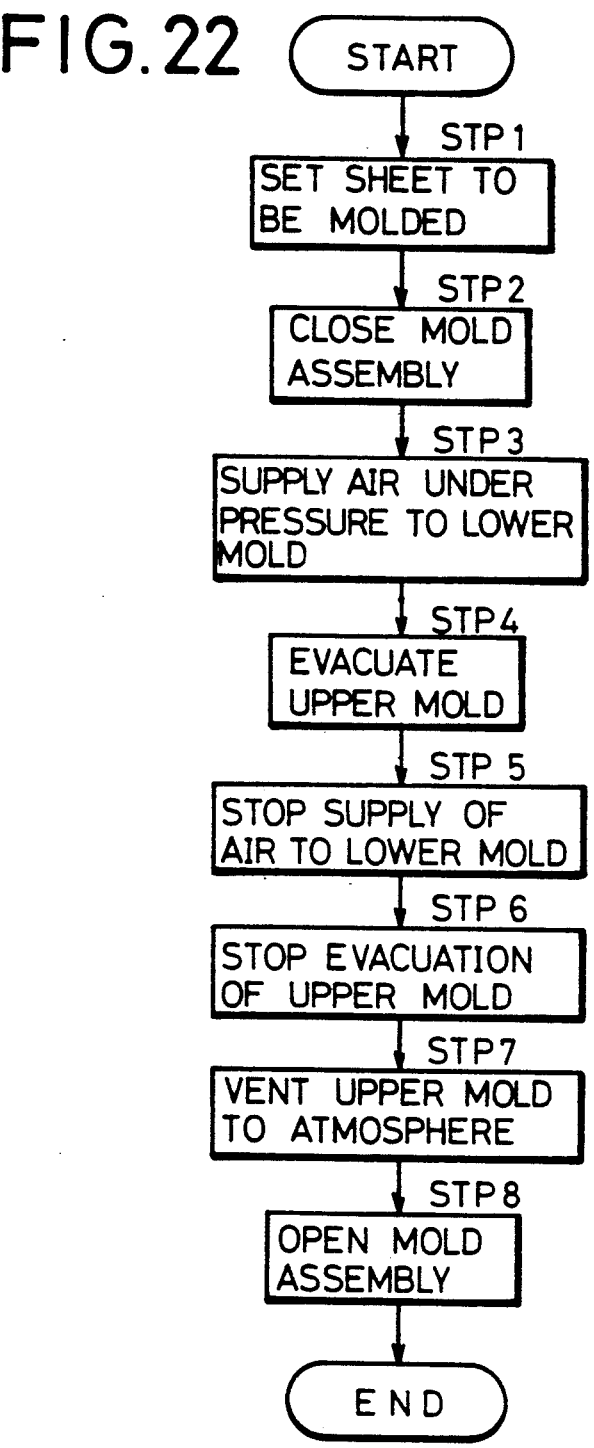

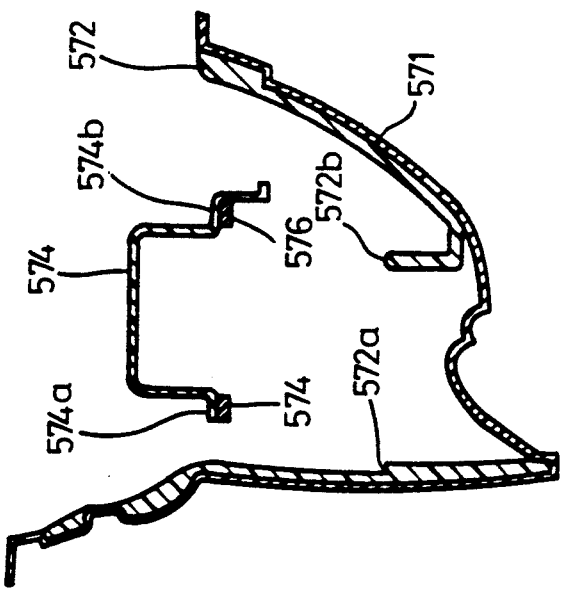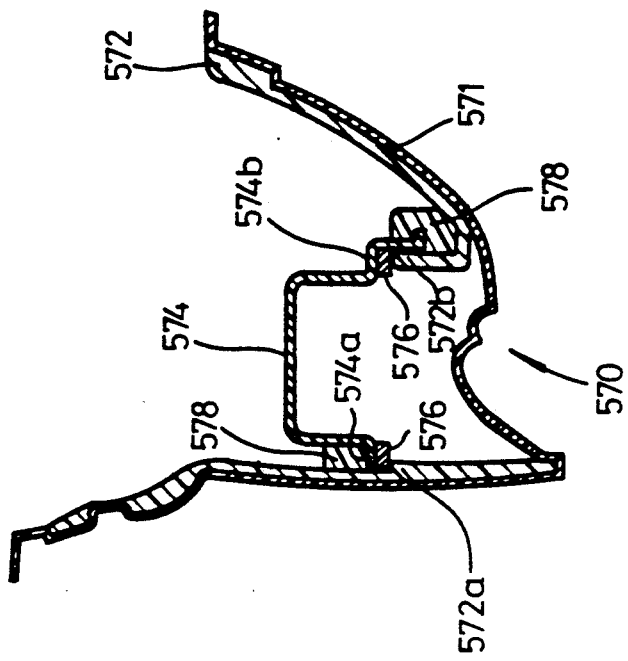

TRIM MEMBER FOR MOTOR VEHICLE AND METHOD OF AND SYSTEM FOR MANUFACTURING THE SAME

This application is a continuation of application Ser. No. 07/440,245 filed on Nov. 22, 1989, now abandoned.

BACKGROUND OF THE INVENTION

1. Field of the Invention

The present invention relates to a trim member or interior furnishing use in a motor vehicle, which is composed of a unitary assembly of a covering sheet, an instrument panel, and a foamed body, and a method of and an apparatus for manufacturing such a trim member.

2. Description of the Background Art

Trim members used as interior furnishings which incorporate a motor vehicle instrument panel are mostly grained on their outer surface to give a realistic impression of leather. More specifically, a trim member of synthetic resin is embossed to give its outer side a leather-like appearance which makes the trim member look rich and sophisticated. To make such a grained trim member soft to the touch, the trim member includes a composite sheet comprising a foamed sheet of vinyl chloride applied as a cushioning layer to a leather sheet of vinyl chloride.

Generally, there have widely been adopted two methods of manufacturing grained trim members for automobiles. According to the first method, a covering sheet which is embossed on its outer surface is softened with heat and held against one pressure mold member of a molding device, and a core member coated with an adhesive on the surface to be adhered to the covering sheet is held against another pressure mold member. Then, the pressure molding members are pressed against each other to join and form the covering sheet and the core member to a desired shape, thus completing a trim member.

According to the second method, a covering sheet which has been softened with heat is attracted under vacuum to an embossing mold member of a molding device. The embossing mold member is in the form of a porous electro-formed mold member. Thereafter, a core coated with an adhesive and held against another mold member is pressed against the covering sheet which has been attracted to the embossing mold member, thereby producing a trim member.

If a trim member including a motor vehicle instrument panel is to be manufactured by these conventional methods, since the trim member to be fabricated is large in size and complex in shape, the trim member has to be formed as two or three separate sections, and then the formed sections have to be joined together. The entire manufacturing process is complicated and requires a number of steps because two or three separate sections have to be formed first to make up a single trim member.

Another problem is that when the formed separate sections are joined together, the lines along which they are joined remain visible on the outer surface of the trim member. As a result, the completed trim member does not look like a unitary body and is poor in appearance because of steps or surface irregularities which are present along the joint lines. Inasmuch as the trim member is made up of the joined sections, the entire rigidity of the trim member is relatively low, and the trim member tends to squeak while the motor vehicle is running. The trim member is also heavy since the core member is used to reinforce the covering sheet.

To the trim member manufactured by the conventional methods, there are attached, by screws, various parts such as ducts, boxes, etc. The overall assembly is thus less resistant to creep. Therefore, after use over a certain period of time, the trim member becomes less rich and sophisticated. Moreover, the overall assembly cannot be assembled with ease, so that the entire manufacturing process is poor in efficiency.

The covering sheet used with the instrument panel is considerably large and complex in shape. Consequently, it is difficult to grain the covering sheet uniformly over its entire surface area, and it is awkward to remove the embossed covering sheet from a impressing mold assembly.

SUMMARY OF THE INVENTION

It is a primary object of the present invention to provide a trim member for use in a motor vehicle, which trim member can be manufactured as a unitary body in its entirety, and a method of and a system for manufacturing such a trim member efficiently, while allowing various parts to be attached to the trim member efficiently.

Another object of the present invention is to provide a trim member for use in a motor vehicle, comprising a covering sheet including one surface having an embossed pattern, a first foamed body disposed on the other surface of the covering sheet, with a first component embedded partly in the first foamed body, and a second foamed body disposed on the other surface and/or the first foamed body, with a second component partly embedded in the second foamed body, the covering sheet, the first foamed body, and the second foamed body being integrally formed as a unitary construction.

Still another object of the present invention is to provide the trim member wherein the first component is made of a magnetic metallic member, and the second component is made of a resin material.

Still another object of the present invention is to provide the trim member wherein each of the first and second foamed bodies is made of a hard urethane foam resin.

Yet another object of the present invention is to provide the trim member wherein the covering sheet is in the form of a composite sheet comprising a leather sheet of resin and a foamed sheet of polyolefin, the leather sheet and the foamed sheet being superposed on each other.

Yet still another object of the present invention is to provide a trim member for use in a motor vehicle, comprising a covering sheet of synthetic resin, a first foamed body disposed on the covering sheet and having a positioning member for positioning a component, and a second foamed body in which the component positioned by the positioning body of the first foamed body is embedded at least partly, the covering sheet, the first foamed body, and the second foamed body being integrally formed as a unitary construction.

A still further object of the present invention is to provide the trim member further including a seal member interposed between the component and the positioning member of the first foamed body.

A yet further object of the present invention is to provide the trim member wherein the seal member comprises a resilient member.

A yet still further object of the present invention is to provide a method of manufacturing a trim member for use in a motor vehicle, comprising the steps of producing a covering sheet complementary in shape to the trim member and including a surface having an embossed pattern, forming a first foamed body on the covering sheet with a first component positioned on the covering sheet and embedded partly in the first foamed body, and forming a second foamed body on the covering sheet and/or the first foamed body with a second component positioned and embedded partly in the second foamed body.

Still another object of the present invention is to provide the method further including the step of blasting a parting agent off the first foamed body after the first foamed body is formed.

Still another object of the present invention is to provide the method further including the step of trimming the second foamed body after the second foamed body is formed.

Yet another object of the present invention is to provide the method wherein the first component is made of a magnetic metallic material, the first foamed body being formed by a first forming device having an upper mold die and a lower mold die, the first component being magnetically attracted to the upper mold die by a magnet, the covering sheet being attracted to the lower mold die by vacuum suction means.

Still another object of the present invention is to provide the method wherein the second component is made of a resin material.

Yet still another object of the present invention is to provide the method wherein the first foamed body is integrally formed with a rib and/or attachment base for positioning the second component when the first foamed body is formed.

Yet still another object of the present invention is to provide the method wherein each of the first and second foamed bodies is made of a hard urethane foam resin.

Yet still another object of the present invention is to provide the method wherein the covering sheet is in the form of a composite sheet comprising a leather sheet of resin and a foamed sheet of polyolefin, the leather sheet and the foamed sheet being superposed on each other.

It is also an object of the present invention is to provide a method of manufacturing a trim member for use in a motor vehicle, comprising the steps of producing a covering sheet complementary in shape to the trim member and including a surface having an embossed pattern, forming a first foamed body on the covering sheet, the first foamed body having a positioning member for positioning a component, and forming a second foamed body with the component positioned by the positioning member being embedded at least partly therein.

Another object of the present invention is to provide the method wherein a seal member is provided on the positioning member of the first foamed body.

Still another object of the present invention is to provide the method wherein the first foamed body and/or the second foamed body is made of a urethane foam resin.

Still another object of the present invention is to provide a method of manufacturing a trim member for use in a motor vehicle, comprising the steps of forming a covering sheet of a predetermined shape by pressing a sheet blank between a first fixed mold die and a second movable mold die supported on a die ram, holding an exposed end of the covering sheet pressed between the first and second mold dies, with gripping means mounted on a frame ram which is movable between the first and second mold dies, elevating the die ram and the frame ram such that the die ram is displaced at a speed lower than the frame ram, for thereby separating the covering sheet from the second mold die, and mounting a component and a foamed body on the covering sheet.

Still another object of the present invention is to provide a method of manufacturing a trim member for use in a motor vehicle, comprising the steps of pressing a preheated blank between first and second mold dies, supplying air under pressure to the blank through the first mold die or the second mold die, after elapse of a predetermined period of time, attracting the blank through the second mold die or the first mold die, for thereby shaping the blank into a covering sheet, and mounting a component and a foamed body on the covering sheet.

Yet another object of the present invention is to provide the method further including the step of transferring a predetermined pattern to a surface of the blank when the blank is shaped into the covering sheet.

Yet another object of the present invention is to provide the method wherein the blank comprises a laminated body of synthetic resin.

Yet still another object of the present invention is to provide a method of manufacturing a trim member for use in a motor vehicle, comprising the steps of forming a covering sheet complementary in shape to the trim member and including a surface having a embossed pattern, placing the covering sheet in a mold die assembly having a cavity, pouring a foam resin into the cavity of the mold die assembly, bringing the covering sheet into contact with a shaping member of a product forming surface of the mold die assembly which defines the cavity, under a pressure produced by the foam resin when it is foamed, for thereby producing a local shape of the covering sheet with the shaping member, and adding a configuration complementary to the shaping member to sheet when the foam resin is hardened.

A further object of the present invention is to provide the method wherein the shaping member comprises a slide core for adding a recess as the configuration to the covering sheet.

A further object of the present invention is to provide the method wherein the shaping member comprises a recess for adding a land as the configuration to the covering sheet.

A still further object of the present invention is to provide a system for manufacturing a trim member for us in a motor vehicle, comprising a covering sheet forming device for forming a covering sheet of a predetermined shape by pressing a sheet blank between first and second mold dies, the covering sheet forming device comprising, a fixed surface plate supporting the first mold die, a vertically movable die ram supporting the second mold die, a frame ram vertically movable between the fixed surface plate and the die ram, and gripping means for gripping an exposed end of the covering sheet when the first and second mold dies are brought together to press the sheet blank.

A further object of the present invention is to provide the system wherein the gripping means comprises a plurality of clamp mechanisms each comprising a fixed clamp arm and a movable clamp arm movable with respect to the fixed clamp arm, the fixed and movable clamp arms having tip ends for gripping the covering sheet, the clamp mechanisms being positioned in confronting relation to and movable toward and away from the first and second mold dies.

Another object of the present invention is to provide the system wherein the frame ram includes first rails extending horizontally and second rails connected to the first rails and extending out of the covering sheet forming device, further including a loading carriage for loading the sheet blank and an unloading carriage movable along the first rails for unloading the covering sheet which is separated from the first and second mold dies, the loading and unloading carriages being movable alternately into and out of the covering sheet forming device along the first rails.

Still another object of the present invention is to provide the system further including configuration maintaining means on the unloading carriage for preventing the covering sheet from being deformed when the covering sheet is separated from the first and second mold dies.

Still another object of the present invention is to provide a system for manufacturing a trim member for use in a motor vehicle, comprising a covering sheet forming device for forming a covering sheet by pressing, pressurizing, and attracting a sheet blank between first and second mold dies, each of the first and second mold dies comprising a first porous layer having a plurality of minute holes and accommodating temperature regulating pipes therein, a second porous layer having a plurality of minute holes and attached as a reinforcing layer to the first porous layer, and at least one of the first and second mold dies having a porous electroformed body disposed on the first porous layer.

Yet another object of the present invention is to provide the system further including a pressure tank for pressurizing the sheet blank and a vacuum tank for attracting the sheet blank under vacuum.

Yet another object of the present invention is to provide the system wherein the porous electro-formed body has a grained surface giving an impression of leather.

Yet still another object of the present invention is to provide a system for manufacturing a trim member for use in a motor vehicle, comprising a covering sheet positioning device for positioning a covering sheet of a predetermined shape in a mold die assembly to form a foamed body integrally with the covering sheet, the covering sheet positioning device comprising a frame, and a plurality of pressers supported on the frame and complementary in shape to different regions of the mold die assembly, for pressing the covering sheet against the different regions of the mold die assembly.

Still another object of the present invention is to provide the system wherein the frame comprises a pipe of resin, the covering sheet positioning device further includes a profile member substantially complementary in shape to the mold die assembly, the pressers being supported on the profile member.

Still another object of the present invention is to provide the system wherein each of the pressers being made of an urethane elastomer.

A further object of the present invention is to provide the system wherein the profile member has a skeleton substantially complementary in shape to the covering sheet, the covering sheet positioning device further including support pipes of resin interconnecting the profile member an the frame.

A further object of the present invention is to provide the system wherein the profile member is substantially complementary in shape to the reverse side of the covering sheet, the profile member and the frame being directly joined to each other.

A still further object of the present invention is to provide the system wherein the profile member has an opening for discharging air out from between the profile member and the covering sheet.

A yet further object of the present invention is to provide the system wherein each of the pressers has suction means for attracting the covering sheet under vacuum.

A yet still further object of the present invention is to provide the system wherein the suction means includes a first pipe connected to a vacuum pump, and a second pipe having one end communicating with a suction hole defined in the each presser and the other end connected to the first pipe.

A yet still further object of the present invention is to provide the system further including a porous resin layer interposed between the suction hole and the second pipe.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 2a through 2d are cross-sectional views illustrative of steps of manufacturing the trim member shown in FIGS. 1a through 1c;

FIG. 4 is front elevational view of a device for forming a covering sheet;

FIG. 5 is a front elevational view of the covering sheet forming device shown in FIG. 4;

FIG. 6 is a front elevational view of the covering sheet forming device, showing a condition in which a formed covering sheet is removed from the covering sheet forming device;

FIG. 7 is a side elevational view of the covering sheet forming device;

FIG. 8b is an enlarged cross-sectional view showing an encircled portion H in FIG. 8a;

FIG. 9 is a fragmentary perspective view of a product gripping means in the covering sheet forming device;

FIG. 20 is a vertical cross-sectional view of a second forming device used in a second foaming step;

FIG. 22 is a flow chart of the covering sheet forming method;

FIGS. 30a and 30b are vertical cross-sectional views illustrative of a method of manufacturing a motor vehicle trim member according to another embodiment of the present invention;

DETAILED DESCRIPTION OF THE PREFERRED EMBODIMENTS

Figure 1A:
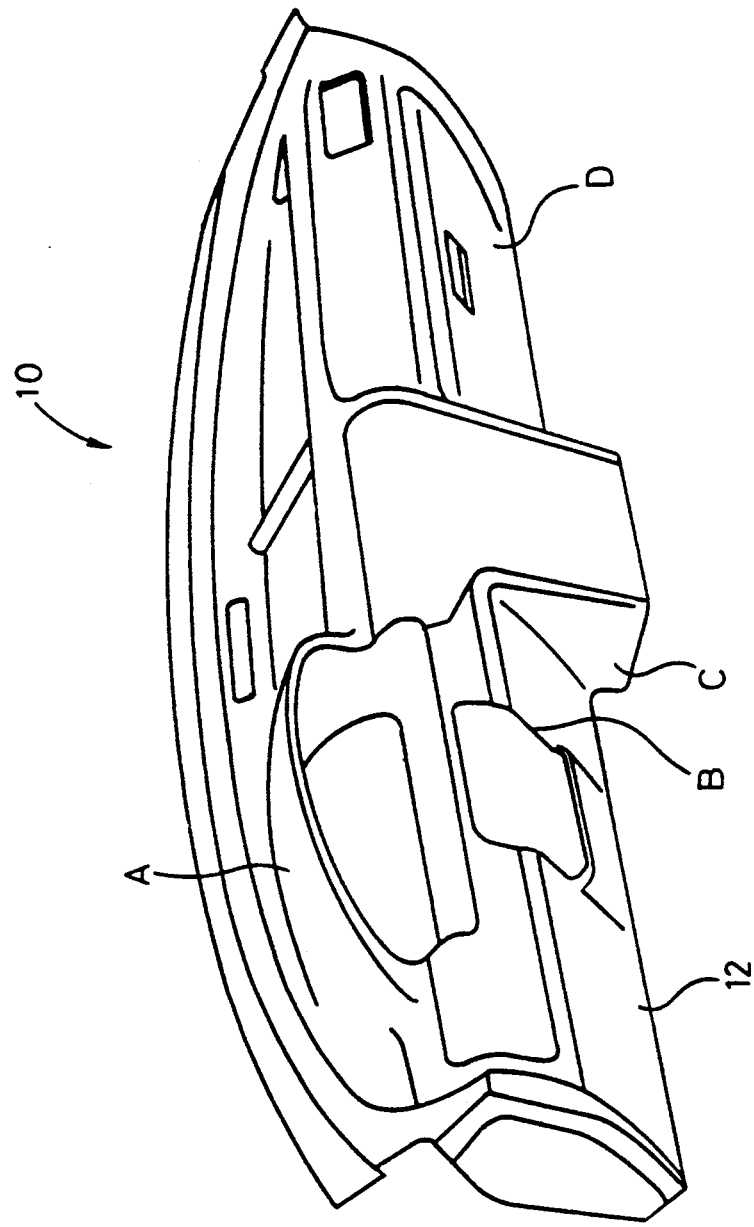
FIGS. 1a through 1c are perspective views of a trim member for use in a motor vehicle, according to the present invention.

FIGS. 1a, 1b, 1c, and 2d show a trim member, generally denoted at 10, for use as an interior furnishing in a motor vehicle. As shown in FIG. 2d, the trim member 10 comprises a covering sheet 12 which is embossed or grained to given an impression of leather, a first foamed body 14 disposed on the reverse side of the covering sheet 12, a first component 16 molded in the first foamed body 14, a second foamed body 18 disposed on the first foamed body 14 and/or the covering sheet 12, and a second component 20 molded in the second foamed body 18.

As shown in FIG. 1a, the trim member 10 has an instrument panel attachment region A positioned on a lefthand side thereof and having a curved configuration, a steering wheel attachment region B positioned below the instrument panel attachment region A, a storage box C positioned substantially centrally in the trim member 10 and shaped to store an air-conditioning unit, etc. therein, and a glove box D positioned on a lower righthand side of the trim member 10 and having an openable and closable lid.

The covering sheet 12 is in the form of a composite sheet comprising a leather sheet of polyvinyl chloride or the like and a foamed sheet of polyolefin, the leather sheet and the foamed sheet being adhered to each other. The first and second foamed bodies 14, 18 are made of hard urethane foam resin.

Figure 1B:
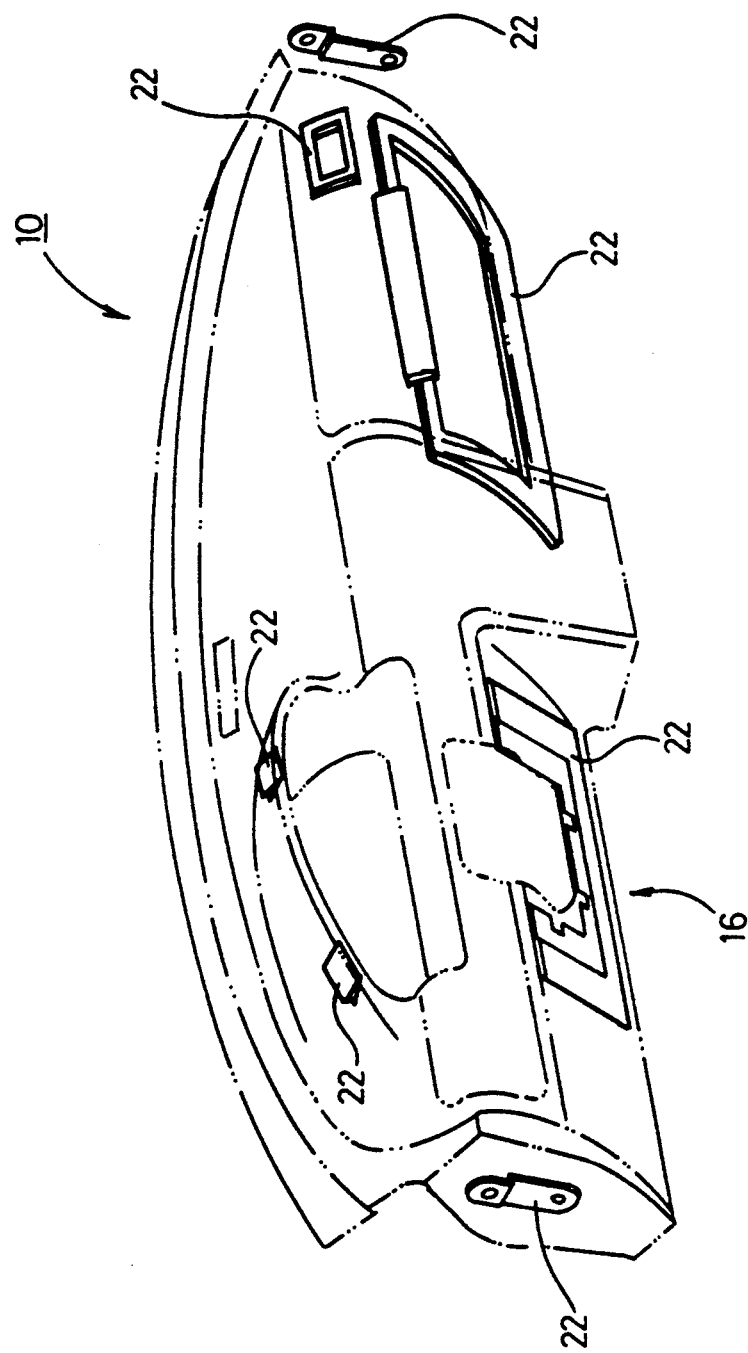
Figure 1C:
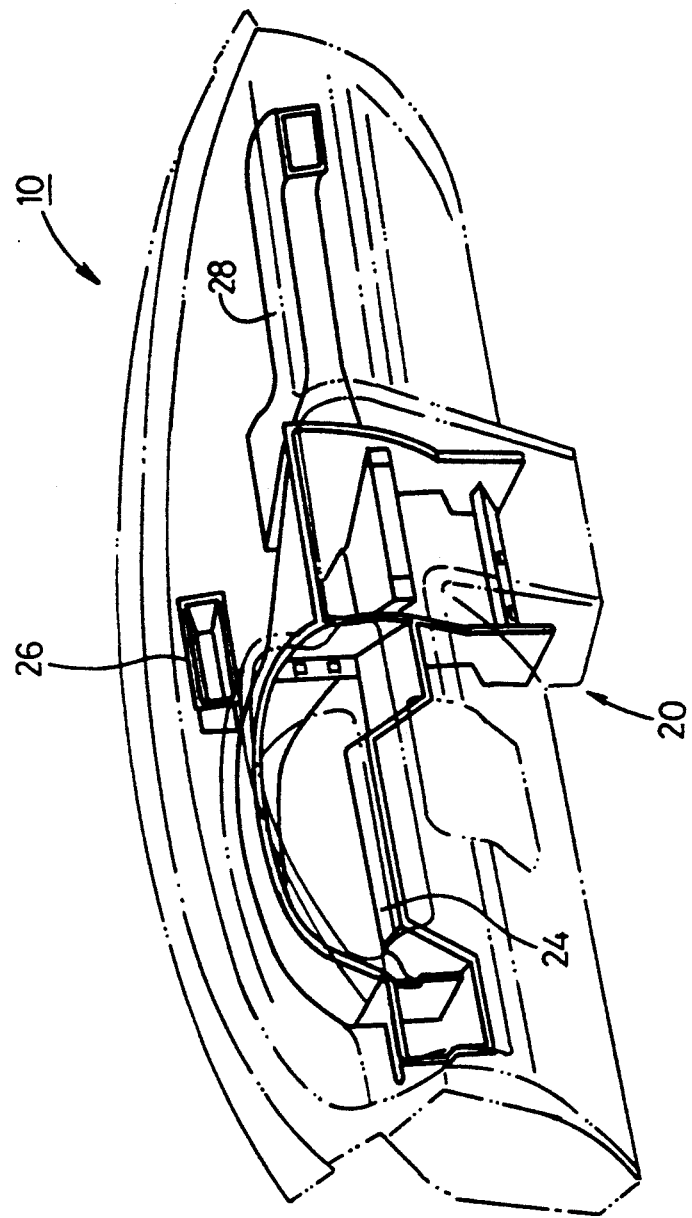

As shown in FIG. 1b, the first component 16 includes a plurality of brackets 22 made of a magnetic metallic material such as a steel sheet, the brackets 22 doubling as reinforcements for the trim member 10. As illustrated in FIG. 1c, the second component 20 includes an instrument back box 24, a clock box 26, and a side duct 28, which are all made of a resin material.

Figure 3:
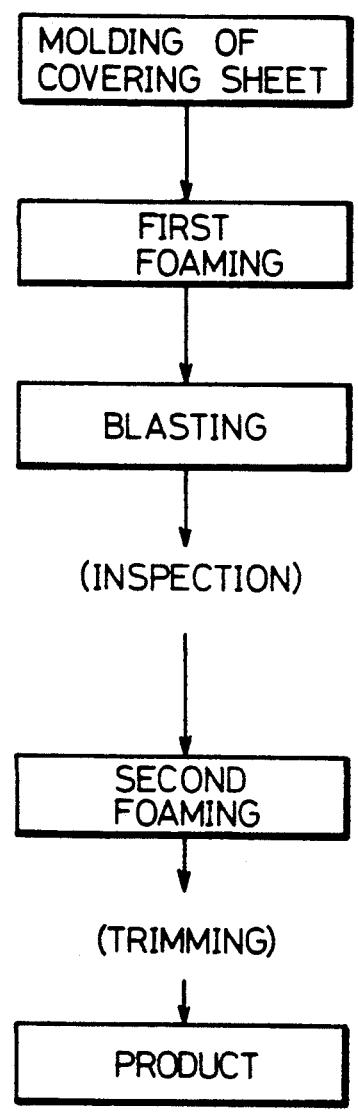
FIG. 3 is a chart showing the steps of a manufacturing method according to the present invention.

The trim member 10 is manufactured according to steps which are schematically shown in FIG. 3. Various devices of a manufacturing system, which are used in the steps shown in FIG. 3, will be described below.

FIGS. 4 through 7 shows a device 30 for forming a covering sheet in a covering sheet molding step. The covering sheet forming device 30 has a lower surface plate 32, four guide posts 34a through 34d vertically disposed at the respective corners of the lower surface plate 32, and an upper surface plate 36 fixed to the upper ends of the guide posts 34a through 34d.

A lower die base 38 is fixedly mounted on the lower surface plate 32, and a first mold die 40 is fixedly mounted as a male die on the lower die base 38. A die ram 42 which is vertically displaceable while being guided by the guide posts 34a through 34d is disposed below the upper surface pate 36.

The die ram 42 is connected to a piston rod 43a of a die clamping hydraulic cylinder 43 mounted on the upper surface plate 36. A second mold die 46 as a female die is fixed to the lower surface of the die ram 42 with a die plate 44 interposed therebetween. The first mold die 40 has a convex product forming surface, and the second mold die 46 has a concave product forming surface. The convex and concave product forming surfaces jointly shape a unit sheet S (FIG. 4) into a predetermined configuration, i.e., corresponding to the covering sheet 12 of the motor vehicle trim member which incorporates an instrument panel. The unit sheet S is loaded into the covering sheet forming device 30 after it has been heated by a heating device, which will be described later on.

A tank 48 containing air under pressure is disposed in the lower surface plate 32. The tank 48 is supplied with air under pressure from a source of air under pressure, and supplies air under pressure to the first mold die 40 through an air pressure pipe 48a connected to the tank 48. A vacuum tank 50 connected to a vacuum pump is disposed in the upper surface plate 36, and also connected to the second mold die 46 through a vacuum pipe 50a. When the vacuum pump is actuated, a vacuum is developed in the second mold die 46 through the vacuum tank 50 and the vacuum pipe 50a for attracting the unit sheet S to the second mold die 46.

Figure 8A:
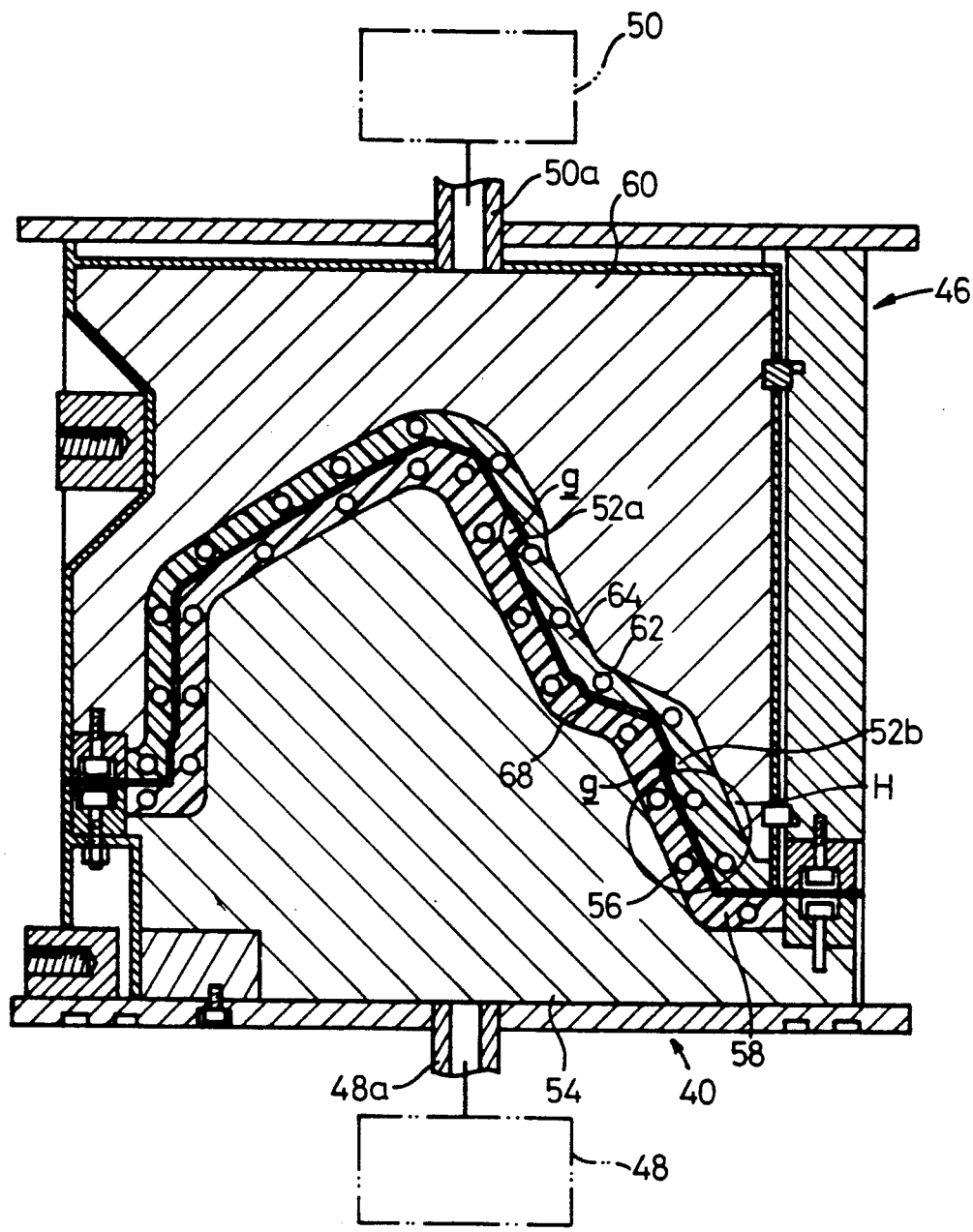
FIG. 8a is a vertical cross-sectional view of a mold assembly used in the covering sheet forming device.

FIG. 8a shows the first and second mold dies 40, 46 which are brought together. The convex and concave product forming surfaces of the first and second mold dies 40, 46 which mate with each other are substantially complementary with each other. The second mold die 46 has sharply inclined surface portions 52a, 52b (hereinafter referred to as "undercut surface portions") each having a gap g.

Figure 8B:
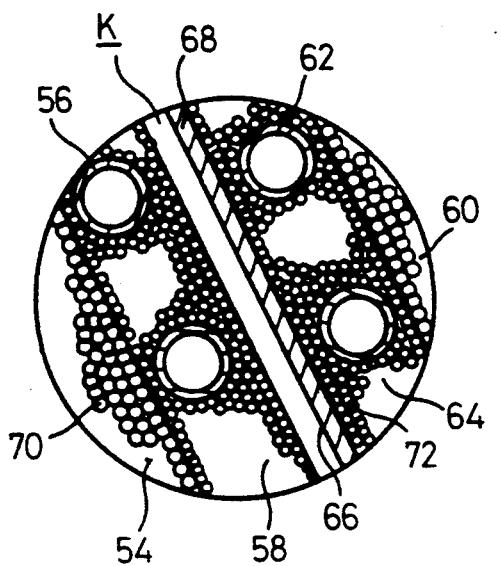

FIG. 8b shows at an enlarged scale an encircled area H in FIG. 8a. As shown in FIG. 8b, the first mold die 40 comprises a porous layer 54 having a countless number of minute holes and serving as a reinforcing body, and a porous layer 58 accommodating therein pipes 56 for regulating temperatures. The second mold die 46 comprises a porous layer 60 having a countless number of minute holes and serving as a reinforcing body, a porous layer 64 accommodating pipes 62 for regulating temperatures, and a porous electro-formed body 68 joined to the porous layer 64 and having an embossing or impressing surface 66. The porous electro-formed body 68 is placed on the porous layer 64, and there is a clearance K between the porous layer 58 and the porous electro-formed body 68. The clearance K is slightly smaller in dimension than the thickness of the unit sheet S to be shaped. Each of the porous layers 54, 60 comprises a countless number of minute glass beads 70 joined together by thermosetting resin, with vent holes or interstices defined between the glass beads 70. The structure of such a porous layer is disclosed in detail in Japanese Laid-Open Patent Publication No. 61(1986)-272126.

Each of the porous layers 58, 64 attached to the respective porous layers 54, 60 and accommodating the temperature regulating pipes 56, 62 is composed of a countless number of steel balls 72 partly joined together by thermosetting synthetic resin, with a countless number of vent holes or interstices defined between the steel balls 72. The construction of such a porous layer is also disclosed in detail in Japanese Laid-Open Patent Publication No. 61(1986)-272126, referred to above. In FIG. 8b, only some of the glass beads 70 and the steel balls 72 are shown.

Figure 8C:
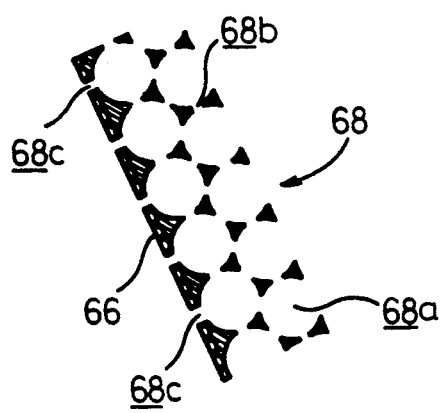
FIG. 8c is an enlarged fragmentary cross-sectional view of a porous electro-formed body.

FIG. 8c schematically shows the porous electro-formed body 68. The embossing surface 66 of the porous electro-formed body 68, which has a certain pattern of surface irregularities, faces the porous layer 58 of the first mold die 40. The porous electro-formed body 68 includes cavities 68a, communication holes 68b, and minutes holes 68c in the embossing surface 66.

The porous electro-formed body 68 is fabricated as follows: First, a precise model including a surface which bears an embossing pattern similar to a cow leather surface pattern, for example, is produced, and then an electrically conductive layer is formed on the embossing pattern surface. Minute particles of synthetic resin such a polypropylene are attached by solvent welding to the electrically conductive layer by an organic solvent. Then, metal is electrodeposited on the model with the embossing pattern by an electroforming process, thus producing a porous electro-formed body. The minute particles of synthetic resin are then extracted from the porous electro-formed body, which are now formed with a countless number of minute holes. For further details, reference should be made to Japanese Laid-Open Patent Publication No. 61(1986)-163290.

As shown in FIG. 7, a frame ram 76 including cylindrical slidable members 74a through 74d slidably fitted over the guide posts 34a through 34d, respectively, is disposed between the die ram 42 and the lower surface plate 32. The frame ram 76 is coupled to a piston rod 78 extending downwardy from an auxiliary hydraulic cylinder 78 disposed on the lower surface of the upper surface plate 36. The frame ram 76 is equipped with gripping means 80, 82 for gripping an end of the unit sheet S.

The gripping means 80, 82 are identical in construction to each other. Only the gripping means 80 will hereinafter be described with reference to FIGS. 9 and 10. Those parts of the gripping means 82 which are identical to those of the gripping means 80 are denoted by identical reference numerals, and will not be described in detail.

To the frame ram 76, there is fixed an attachment member 86 with a cylinder 90 affixed to a lower surface thereof by a bracket 88. The cylinder 90 has a piston rod 90a coupled to a support 94 through a joint 92. Sliders 96a, 96b are mounted on the support 94 and engage guide rails 98a, 98b which are fixed to the attachment member 86.

Sheet clamps 100a through 100c as a sheet clamp mechanism are mounted on the support 94 at predetermined spaced intervals. The sheet clamps 100a through 100c include first clamp arms 104a through 104c fixed to respective brackets 102a through 102c secured to the support 94, and second clamp arms 108a through 108c angularly movably supported on the brackets 102a through 102c, respectively, through respective shafts 106. The second clamp arms 108a through 108c have proximal ends connected to respective piston rods 112a through 112c of cylinders 110a through 110c mounted on the brackets 102a through 102c, respectively.

Figure 11:
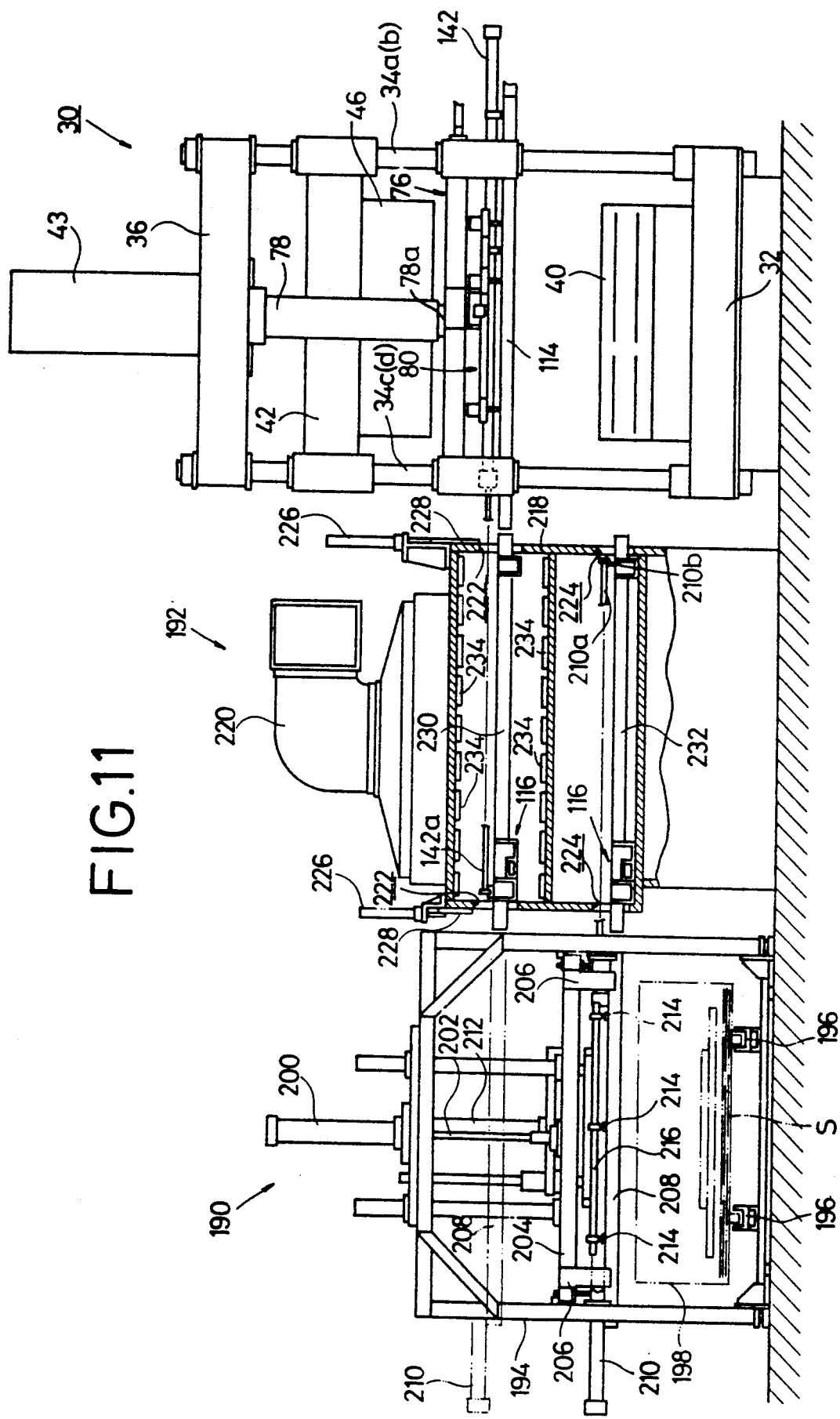
FIG. 11 is a side elevational view, partly in cross section, of the covering sheet forming device, a charging device, and a heating device which are installed in combination with each other.
Figure 12:
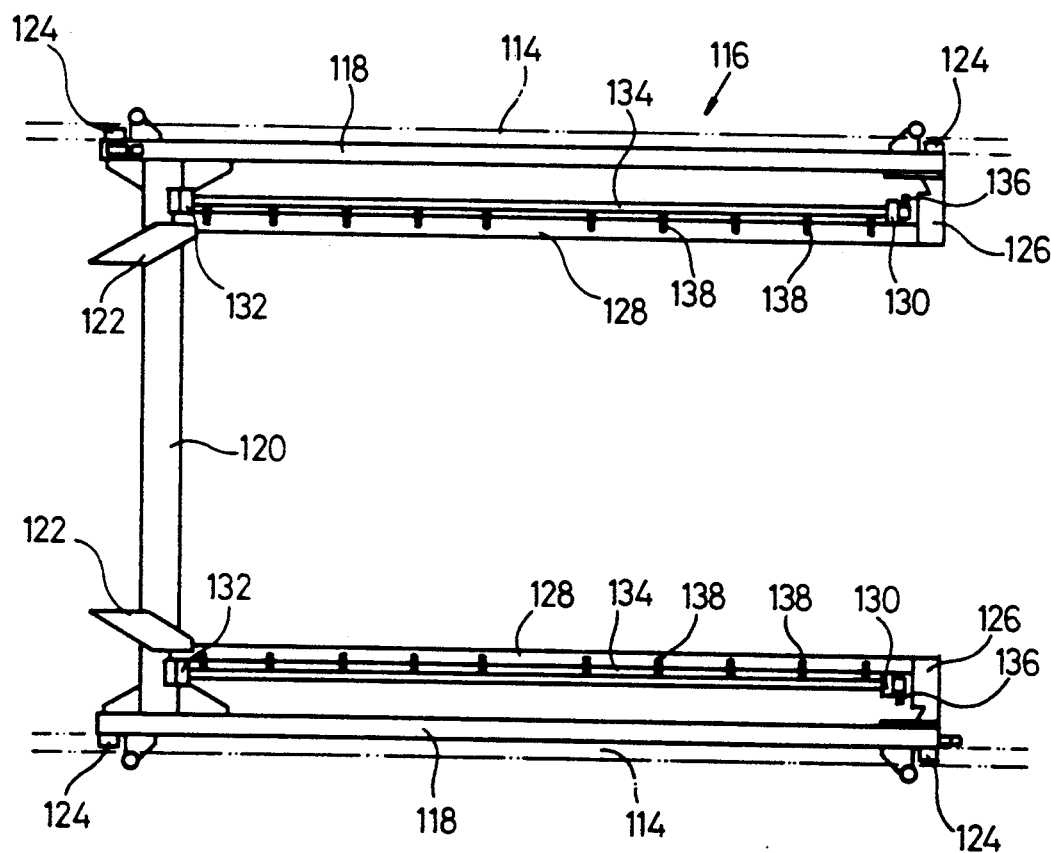
FIG. 12 is a plan view of a loading carriage.
Figure 13:
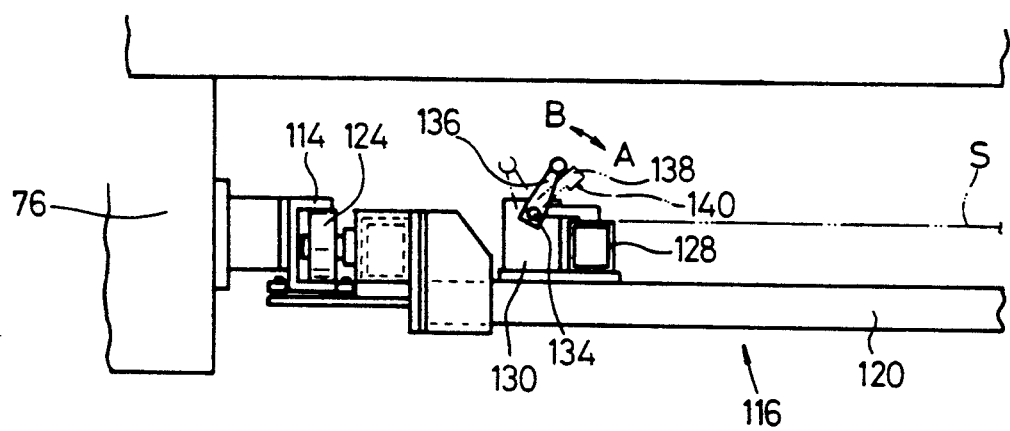
FIG. 13 is a fragmentary side elevational view of the loading carriage.

As illustrated in FIG. 11, a pair of first parallel rails 114 is supported on the frame ram 76, and a loading carriage 116 having a mechanism for holding a unit sheet S is mounted on the first rails 114. The loading carriage 116 is shown in plan in FIG. 12. In FIG. 12, the loading carriage 116 is in the form of a frame-like carriage which comprises a pair of parallel members 118 parallel to the first rails 114 and a cross member 120 extending between ends of the parallel members 118, with a pair of guide plates 122 for guiding a unit sheet S being attached to the ends of the cross member 120. Rollers 124 rollingly fitted in respective grooves defined in the first rails 114 are mounted on the opposite ends of the parallel members 118. Supports 126 extend inwardly from the distal ends of the parallel members 118 toward each other, with hollow rectangular pipes 128 extending between the supports 126 and the cross member 120. Shafts 134 are rotatably supported on and extend between brackets 130, 132 attached to the opposite ends of the rectangular pipes 128. As shown in FIG. 13, an arm 136 is integrally attached to one end of each of the shafts 134. A plurality of clamp levers 138 are mounted at certain spaced intervals on each of the shafts 134. A needle 140 (FIG. 13) for piercing and holding a unit sheet S is embedded in each of the clamp levers 138. The loading carriage 116 of the above construction is movable into the covering sheet forming device 30 by a cylinder 142 (see FIG. 11).

Figure 14:
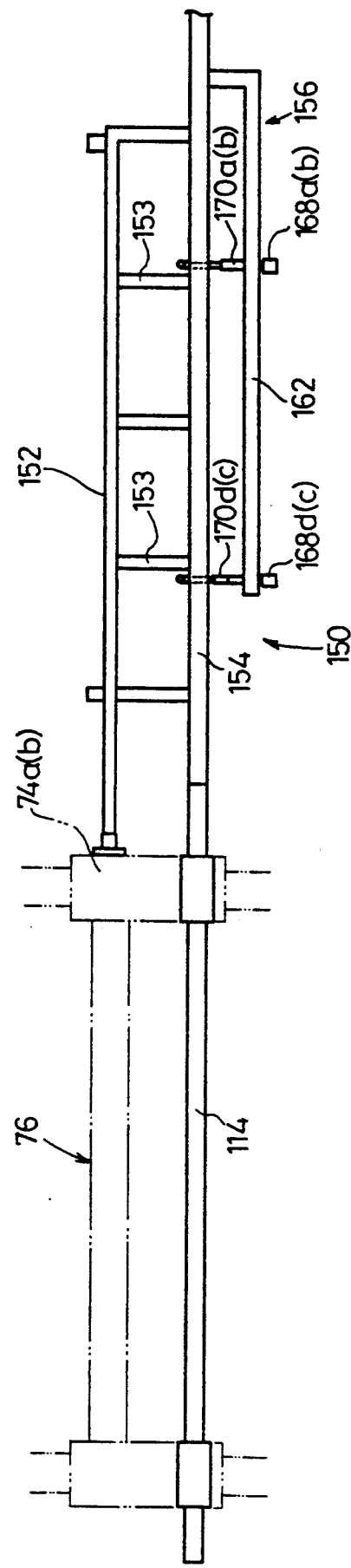
FIG. 14 is a view of rails for unloading a covering sheet from the covering sheet forming device and also of an unloading loading carriage.
Figure 15:
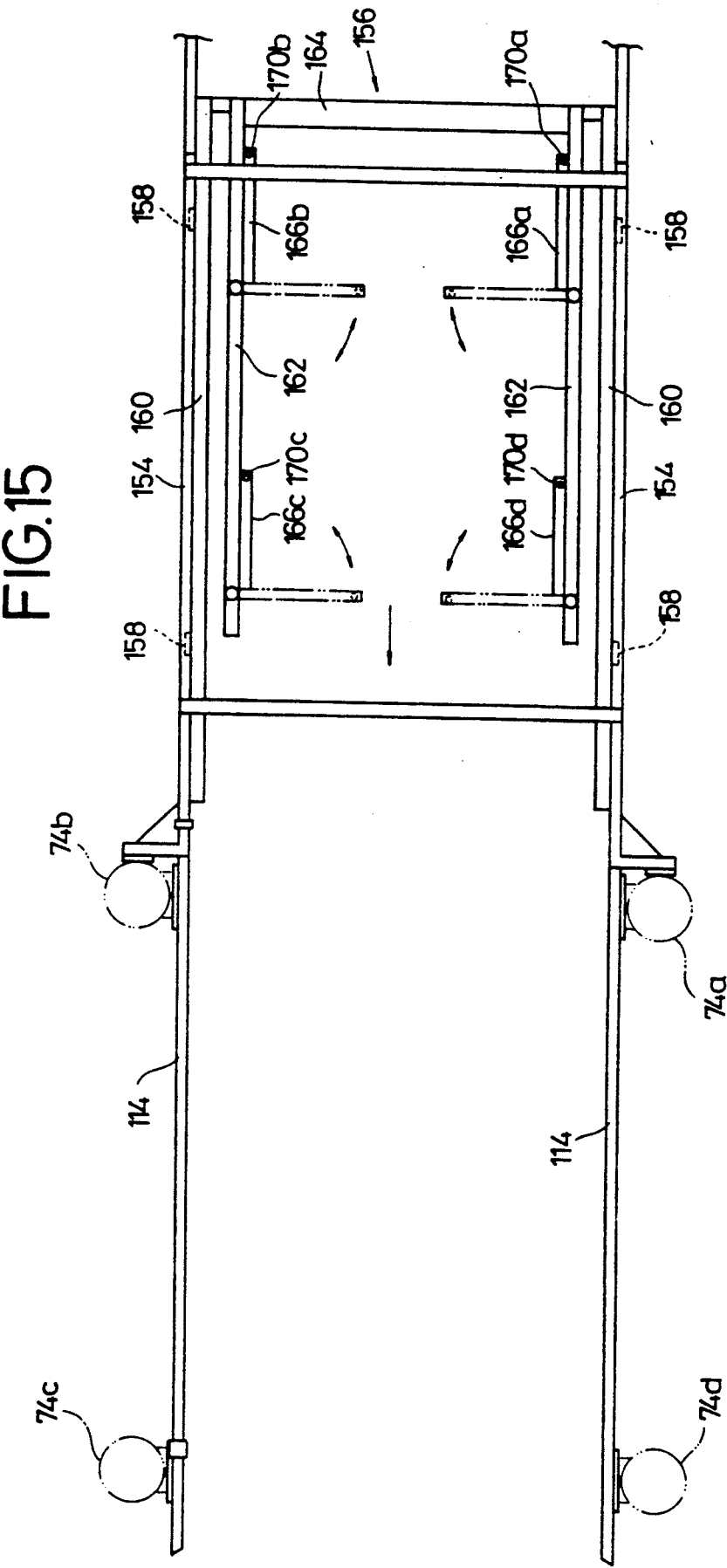
FIG. 15 is a plan view of the unloading carriage.

FIGS. 14 and 15 show an unloading means 150 for unloading a covering sheet 12 after the covering sheet 12 has been formed from a unit sheet S that has been supplied by the loading carriage 116. Second rails 154 are supported by support pieces 158 on a pair of cantilever beams 152 which are fixed to the slidable members 74a, 74b. The second rails 154 are continuously joined to the respective first rails 114, so that an unloading carriage 156 can move from the second rails 154 along the first rails 114 into the covering sheet forming device 30, in which the unloading carriage 156 receives a formed covering sheet 12, after which the covering sheet 12 will be discharged. Therefore, the first rails 114 are shared by the loading carriage 116 and the unloading carriage 156.

The unloading carriage 156 is also of a frame-like shape as with the loading carriage 116. As shown in FIG. 15, the unloading carriage 156 comprises parallel members 160 engaging the respective second rails 156 through a plurality of rollers 158, and a cross member 164 extending between and joined to ends of the members 160, the cross member 164 support workpiece frames 162 in a cantilevered fashion. Angularly movable arms 166a through 166d are connected to the workpiece frames 162. The arms 166a through 166d are angularly movable in the directions indicated by the arrows by respective motors 168a through 168d (FIG. 14), and have respective holder bars 170a through 170d on their distal ends for maintaining the shape of a received covering sheet 12, the holder bars 170a through 170d being vertically extensible and contractable.

Figure 16:
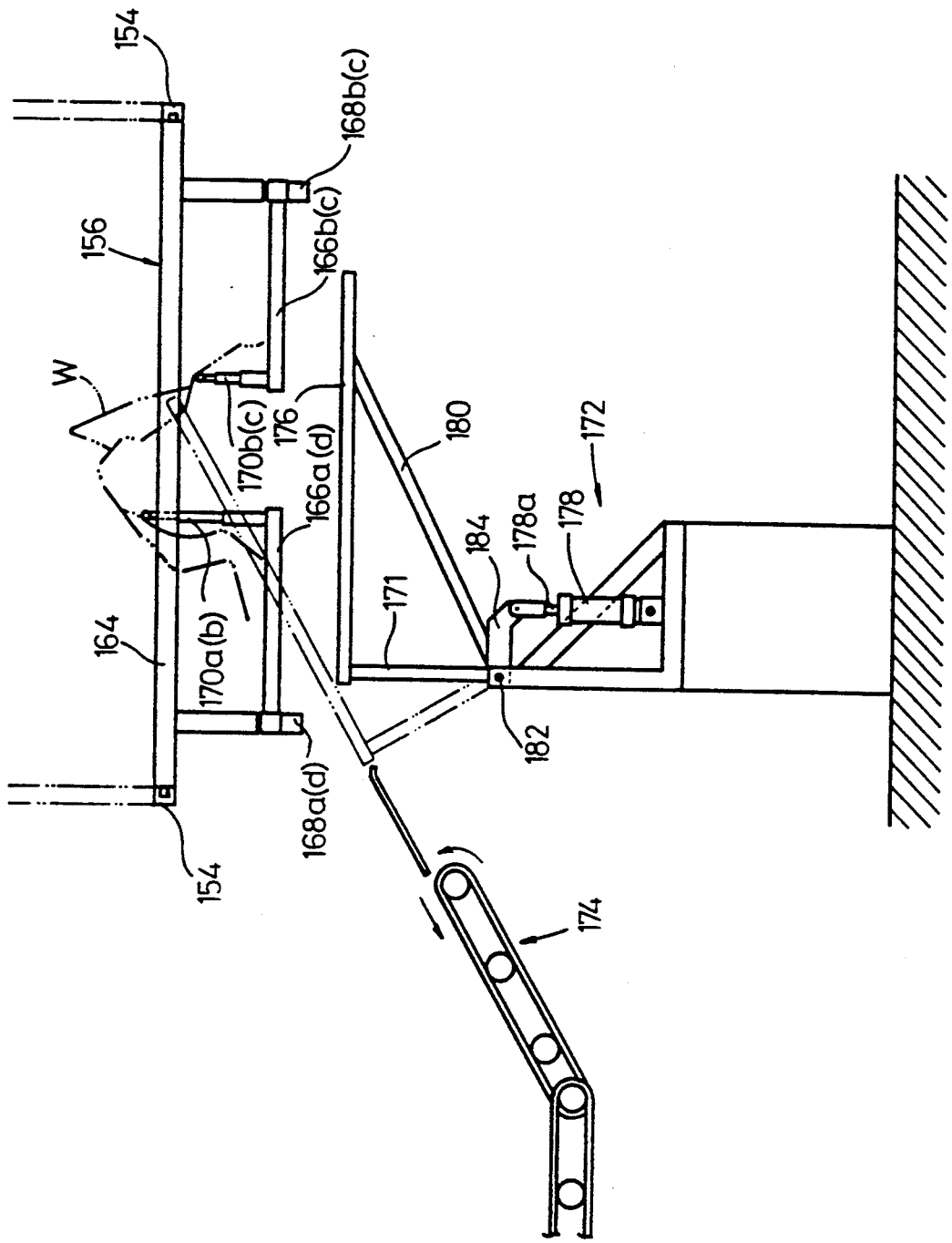
FIG. 16 is a side elevational view of a device for discharging a covering sheet.

As shown in FIG. 16, the terminal ends of the second rails 154 are associated with a discharging device 172 for removing a covering sheet 12 from the unloading carriage 156 and a conveyor 174 for delivering out the covering sheet 12 which has been discharged by the discharging device 172. The discharging device 172 has a discharging arm 176 for lifting a covering sheet 12 from below to remove it from the unloading carriage 156, and a cylinder 178 for angularly moving the discharging arm 176 through a predetermined angle. The discharging arm 176 is supported on beams 180, 171 rotatably supported by a support shaft 182 which is coupled by a joint lever 184 to a piston rod 178a of the cylinder 178. The conveyor 174 is in the form of a belt conveyor in the illustrated embodiment.

FIG. 11 also shows a charging device 190 for charging a unit sheet S, and a heating device 192 for heating a unit sheet S supplied from the charging device 190 in advance of supplying the unit sheet S to the covering sheet forming device 30.

The charging device 190 includes a fixed frame 194 with a pair of rails 196 disposed in a lower position in the frame 194. A sheet pallet 198 which supports a stack of unit sheets S is mounted on the rails 196 so as to be movable into and out of the charging device 190. A vertically movable cylinder 200 is mounted on the top of the frame 194 and has a piston rod 202 with a movable frame 204 fixed to the lower end thereof.

Support pieces 206 vertically depends from the opposite ends of the movable frame 204, and a pair of rails 208 is supported by the support pieces 206. The rails 208 extend parallel to each other in the direction in which a unit sheet S is fed through the charging device 190. A cylinder 210 is fixed to one of the rails 208 for moving the loading carriage 116.

A cylinder 212 is fixed to the movable frame 204 and has a piston rod having a lower distal end to which there is attached a suction member 216 having a plurality of suction cups or discs 214 for taking one unit sheet S at a time from the sheet pallet 198.

The heating device 192 includes a box-shaped housing 218 with an exhaust duct 220 mounted on an upper portion thereof. The housing 218 has upper openings 222 and lower openings 224 defined in its side walls. The upper openings 222 can selectively be opened and closed by doors 228 which are vertically movable by respective cylinders 226 mounted on the housing 218. A pair of upper parallel rails 230 are provided on which the loading carriage 116 is movable extends through the housing 218 and the upper openings 222. Likewise, a pair of lower parallel rails 232 extends through the housing 218 and the lower openings 224. A plurality of heaters 234 for softening a unit sheet S with heat are disposed in the housing 218 above and below the upper rails 230.

The rails 208 in the charging device 190 are vertically movable in upper and lower limit positions, the upper limit position being indicated by the two-dot-and-dash lines in FIG. 11. When the rails 208 are in the upper limit position, the rails 208 are equal in height to the upper rails 230 of the heating device 192. When the rails 208 are in the lower limit position, the rails 208 are equal in height to the lower rails 232 of the heating device 192. In the upper and lower limit positions, the ends of the rails 208 are positioned closely to the confronting ends of the upper and lower rails 230, 232, respectively. The first rails 114 of the covering sheet forming device 30 are also movable between upper and lower limit positions. When the first rails 114 are in the upper and lower positions, their ends are positioned closely to the confronting ends of the upper and lower rails 230, 232, respectively.

Figure 17:
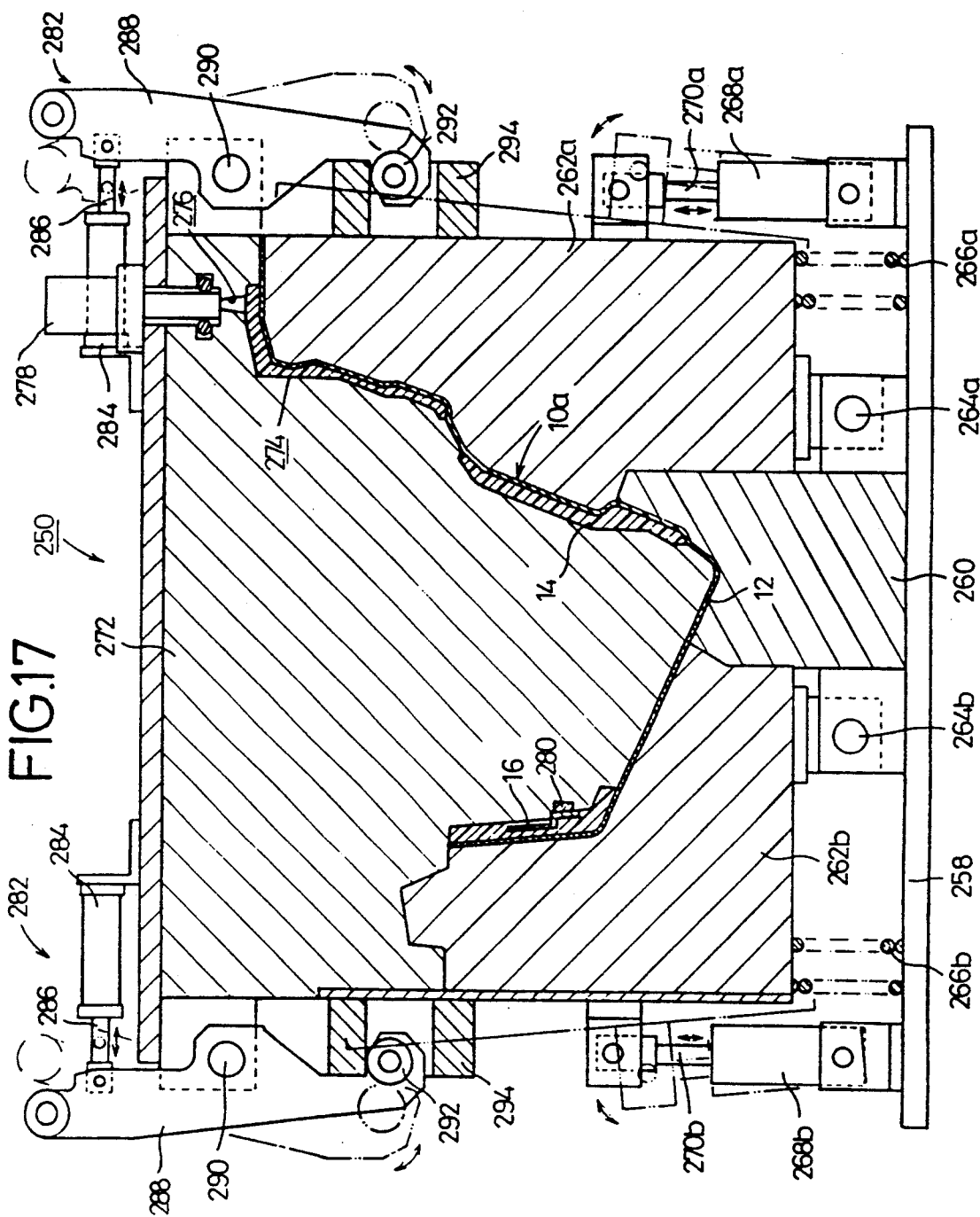
FIG. 17 is a vertical cross-sectional view of a first forming device used in a first foaming step.

FIG. 17 shows a first forming device 250 for use in a first foaming step. The first forming device 250 includes a base 258 on which a lower mold die 260 with a suction mechanism (not shown) is mounted. Side mold dies 262a, 262b are swingably supported on the base 258 by respective support shafts 264a, 264b. Springs 266a, 266b act between the base 258 and lower surfaces of the side mold dies 262a, 262b for normally urging the side mold dies 262a, 262b in a direction toward each other. Cylinders 268a, 268b swingably supported on the base 258 have respective piston rods 270a, 270b operatively coupled to the side mold dies 262a, 262b, respectively.

An upper mold die 272 is vertically movably disposed above the lower mold die 260 and the side mold die 262a, 262b. The upper, lower, and side mold dies 272, 260, 262a, 262b jointly define a cavity 274 which communicates with a nozzle 278 through a passage 276. A magnet 280 for magnetically attracting and holding the first component 16 is attached to the upper mold die 272 at a prescribed position thereon, and a plurality of clamp means 282 for bringing the mold dies of the first forming device 250 together are also mounted on the upper mold die 272. Each of the clamp means 282 has a cylinder 284 having a piston rod 286 coupled to one end of a swingable arm 288. A substantially central portion of the swingable arm 288 is supported on the upper mold die 272 by a pin 290, with a roller 292 rotatably supported on the lower end of the swingable arm 288. When the cylinders 284 are actuated, the rollers 292 are pressed against inner wall surfaces of cylindrical engaging members 294 mounted on the respective side mold dies 262a, 262b for clamping the mold dies of the first forming device 250.

Figure 18:
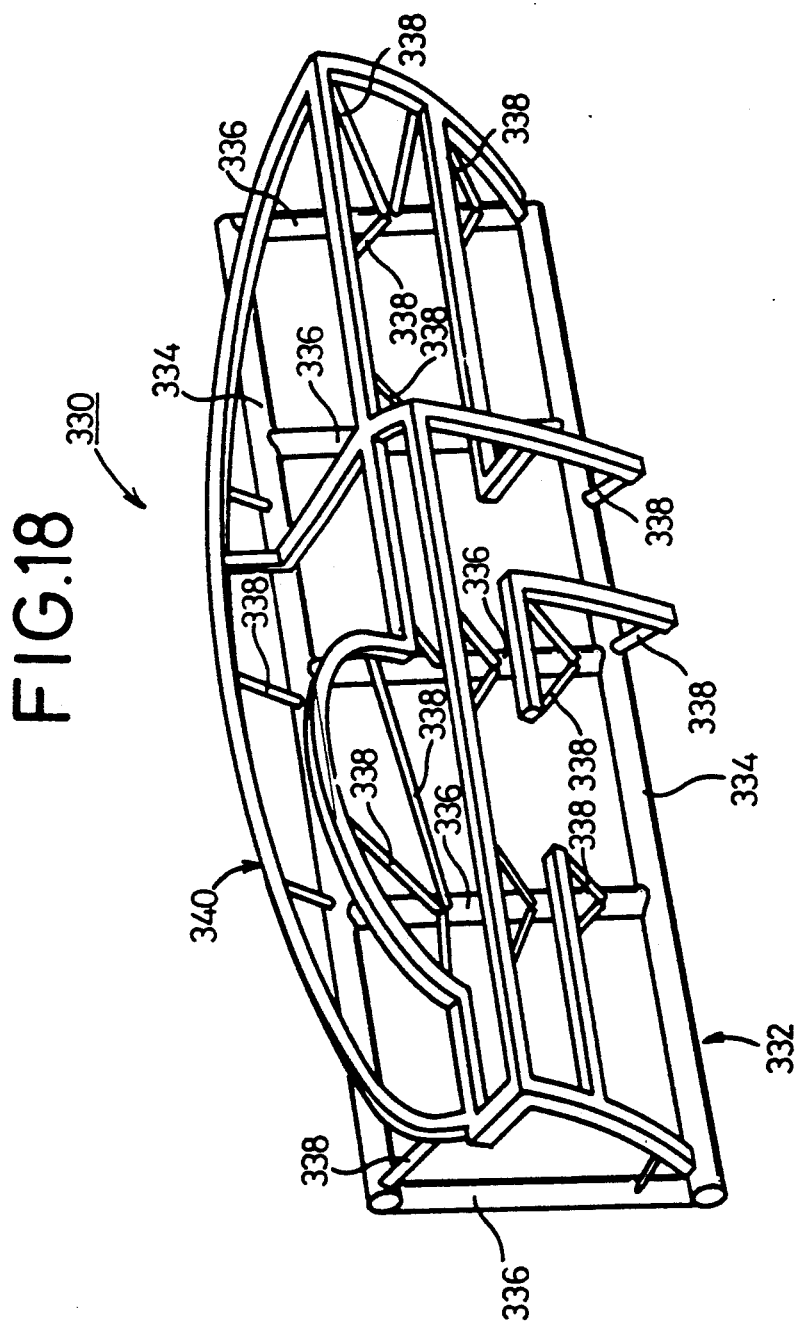
FIG. 18 is a perspective view of a device for positioning a covering sheet.
Figure 19:
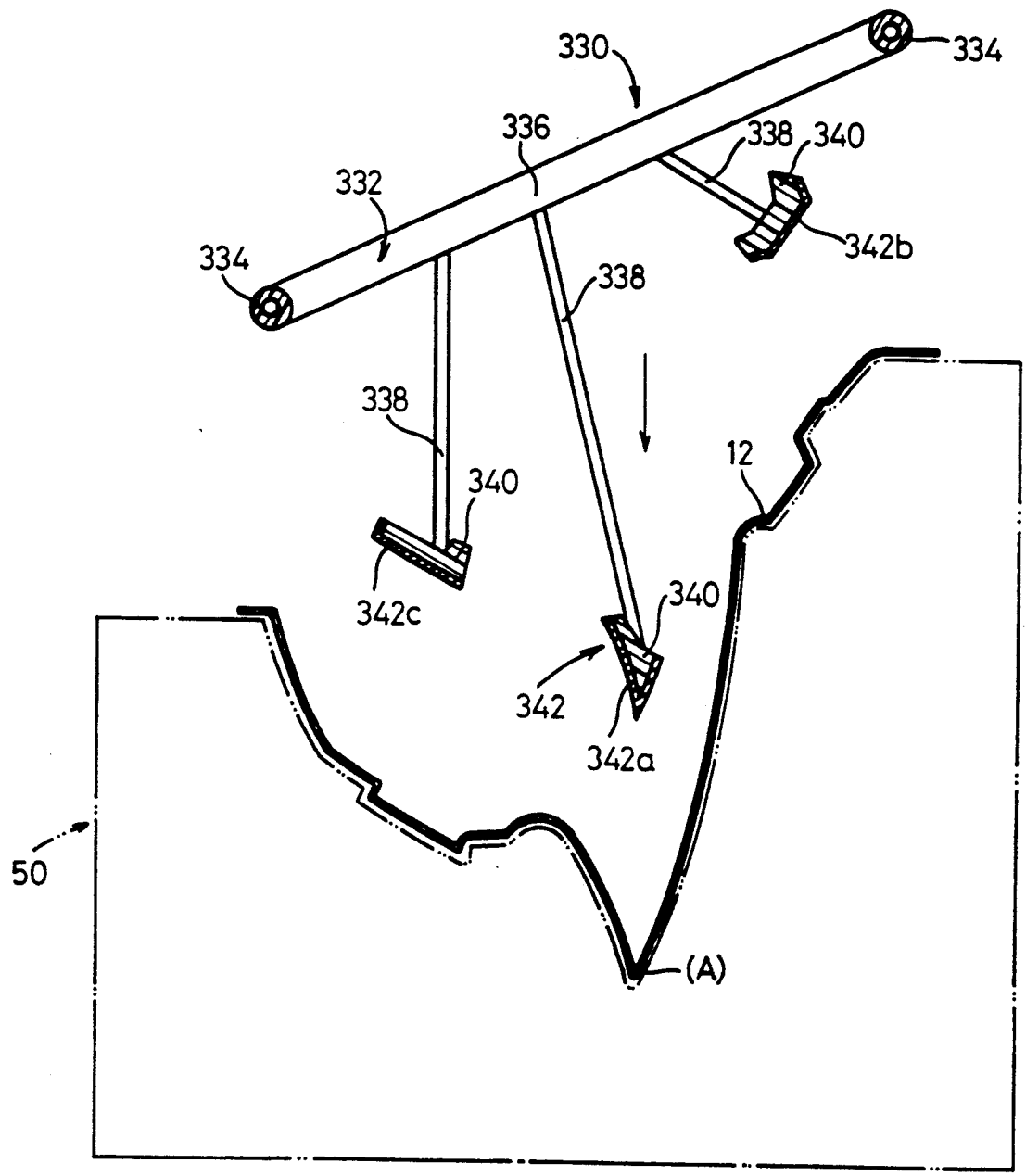
FIG. 19 is a vertical cross-sectional view of the covering sheet positioning device.

A covering sheet positioning device 330 for positioning a covering sheet 12 in the first forming device 250 is shown in FIGS. 18 and 19.

The covering sheet positioning device 330 includes a frame 332 comprising a pair of parallel elongate pipes 334 and five shorter reinforcing pipes 336 extending transversely between the pipes 334. These pipes 334, 336 are in the form of resin pipes made of either glass fibers and epoxy or carbon fibers and epoxy resin. The shorter pipes 336 will also be gripped by the operator when the operator handles the covering sheet positioning device 330.

To the pipes 334, 336, there are joined ends of a plurality of support pipes 338 similar to the pipes 334, 336. A resin profile member 340 which is shaped like a skeleton for a covering sheet 12 is supported on the other ends of the support pipes 338. The profile member 340 is made of glass fibers and epoxy resin so as to have a prescribed degree of rigidity, and has a plurality of pressers 342 complementary in shape to certain portions of a covering sheet 12. The pressers 342 are made of an urethane elastomer, for example, so that they will not damage a covering sheet 12 while they are pressed against the covering sheet 12. As shown in FIG. 19, the pressers 342 are located in alignment with complex and sharply angular regions such as the attachment region A (FIG. 1a) of the trim member 10, and include pressers 342a, 342b, 342c, the presser 342a corresponding to the attachment region A.

A second forming device 350 (see FIG. 20) for use in a second foaming step is substantially the same in structure as the first forming device 250 described above, and will not be described in detail. Parts of the second forming device 350 which are identical to those of the first forming device 250 are denoted by identical reference numerals. The second forming device 350 has a cavity 396 defined therein, and the configuration of an upper mold die 272a of the second forming device 350 is selected to place the second component in the cavity 396.

Although not shown, a blasting device for removing a parting agent which is attached to an intermediate body is disposed between the first and second forming devices 250, 350, as described later on, and a trimming device is disposed downstream of the second forming device 350.

The apparatus for carrying out a method of manufacturing a motor vehicle trim member according to the present invention is basically constructed as described above. Operation and advantages of the apparatus will be described below.

In FIG. 11 the sheet pallet 198 is first introduced into the lower position in the charging device 190, and then the cylinder 212 is operated to lower the suction member 216. An uppermost one of unit sheets S stacked on the sheet pallet 198 is attracted upwardly by the suction cups 214 of the suction member 216. Thereafter, the attracted unit sheet S is elevated up to the rails 208 by the cylinder 212. During this time, the loading carriage 116 is held at rest on the lower rails 282 of the heating device 192.

Thereafter, the cylinder 210 is operated to bring an engaging member 210b (FIG. 11) on the distal end of a piston rod 210a thereof into engagement with the loading carriage 116. The piston rod 210a is retracted to cause the loading carriage 116 to run along the lower rails 232 and then the rails 208 into a position below the unit sheet S which is being attracted by the suction cups 214.

A cylinder (not shown) mounted on the lower surface of the movable frame 204 is actuated to tilt the arms 136 of the loading carriage 116 in the direction indicated by the arrow A (FIG. 13) until the clamp levers 138 fall on the rectangular pipes 128. The needles 140 embedded in the distal ends of the clamp levers 128 now pierce the unit sheet S and then enter holes (not shown) defined in the rectangular pipes 128, whereupon the unit sheet S is held in position on the rectangular pipes 128. After the unit sheet S has fully been held in position on the rectangular pipes 128, the suction cups 214 are inactivated to release the unit sheet S.

Then, the cylinder 200 is operated to lift the movable frame 204 and the rails 208 on which the loading carriage 116 is at rest up to a position at the same height as the upper rails 230 of the heating device 192. The cylinder 210 is now operated to enable the piston rod 210a thereof to move the loading carriage 116 which carries the unit sheet S along the rails 208 and then the upper rails 230 into the heating device 192, while at the same time the unit sheet S is heated up to a temperature near its softening point by the heaters 234.

At this time, the frame ram 76 of the covering sheet forming device 30 has been lifted such that the first rails 114 supported by the frame ram 76 are at the same height as the upper rails 230.

Figure 21C:
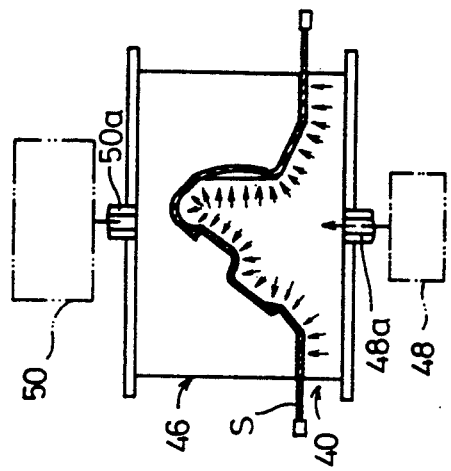
FIGS. 21a through 21d are views illustrative of the steps of a method of forming a covering sheet.
Figure 21D:
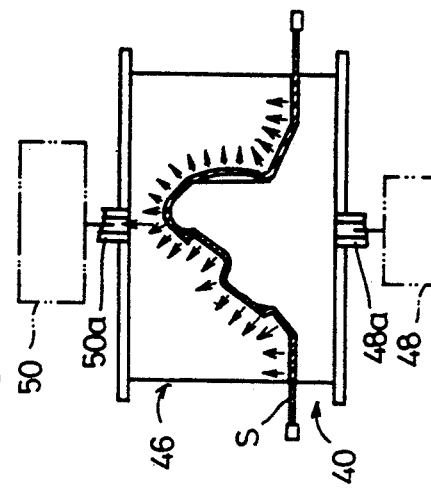
Figure 21A:
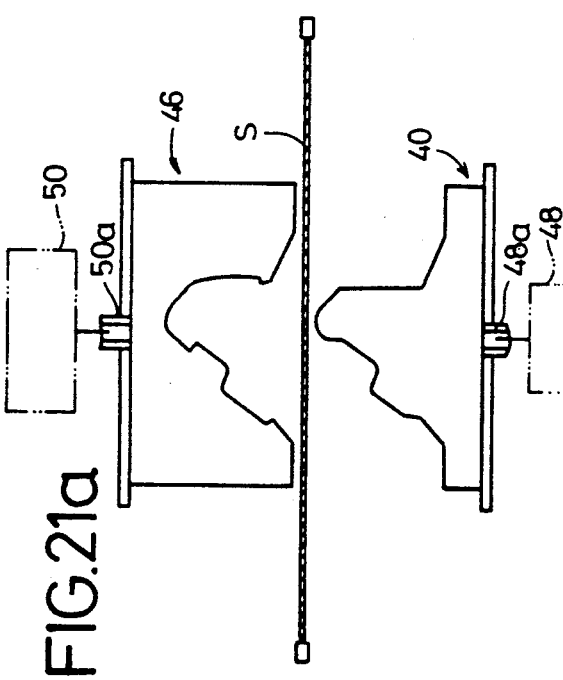

The cylinder 142 supported on the frame ram 76 is now operated to extend its piston rod 142a into the heating device 192 until the distal end of the piston rod 142a is coupled to the loading carriage 116. Thereafter, the cylinder 142 is reversed in operation to retract the piston rod 142a. The loading carriage 116 which holds the unit sheet S runs along the upper rails 230 and then the first rails 114 until the loading carriage 116 reaches a position below the second mold die 46 of the covering sheet forming device 30 (see FIGS. 21a and STP1 in FIG. 22).

Figure 21B:
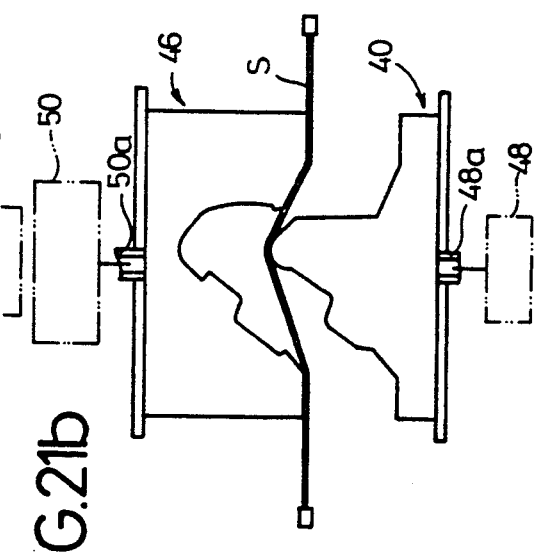
Figure 23:
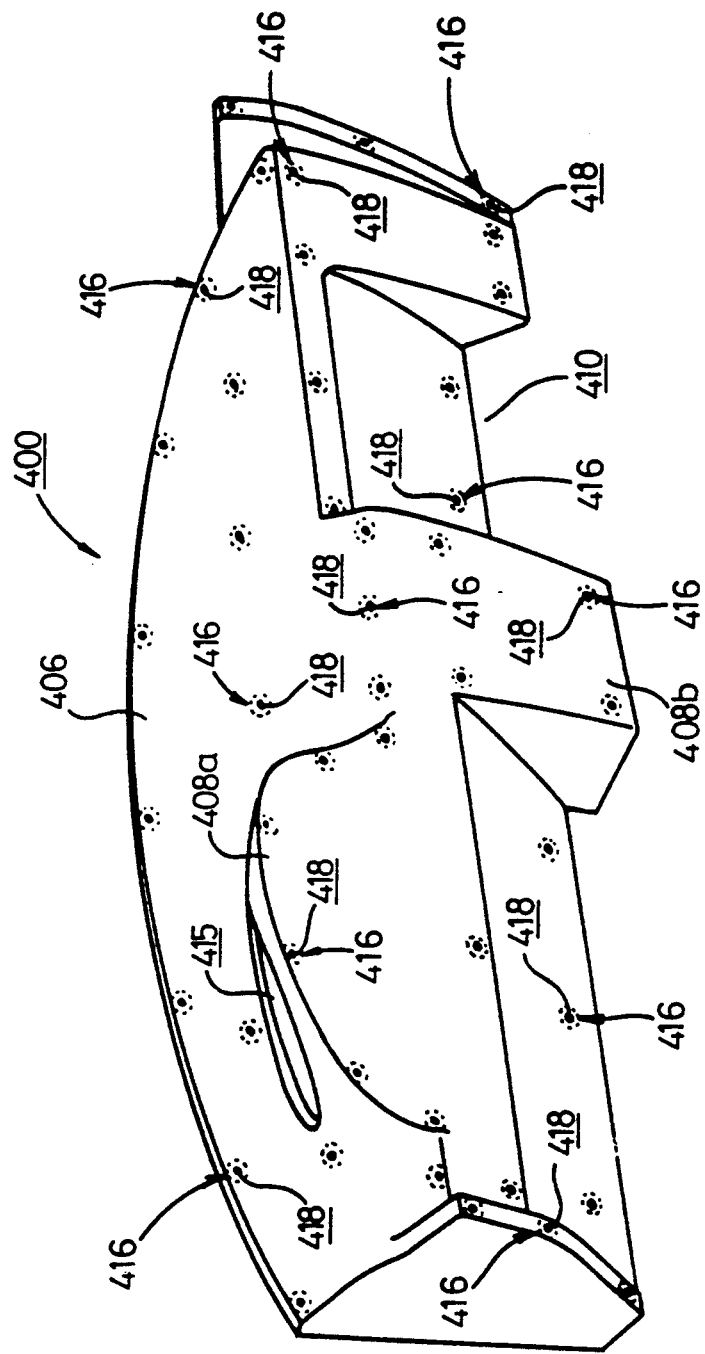
FIG. 23 is a perspective view of a device for positioning a covering sheet according to another embodiment of the present invention.

Subsequently, the piston rod 78a of the auxiliary hydraulic cylinder 78 is lowered to lower the frame ram 76 together with the loading carriage 116 which holds the unit sheet S. Concurrent with this, the piston rod 43a of the hydraulic cylinder 43 is lowered to move the second mold die 46 downwardly in unison with the die ram 42 (see FIG. 21b and STP2 in FIG. 22).

When the first and second mold dies 40, 46 mate with each other, the clearance K which is slightly smaller than the thickness of the unit sheet S is left therebetween. The unit sheet S is now held against the mating surfaces, i.e., the convex and concave product forming surfaces, of the first and second mold dies 40, 42 under a predetermined air pressure. Since the unit sheet S has already been heated, the unit sheet S is so soft and pliable that it is shaped along the mating surfaces of the first and second mold dies 40, 42.

Then, air under pressure is supplied from the air source into the first mold die 40 through the air tank 48 disposed in the lower surface plate 32 of the covering sheet forming device 30. As illustrated in FIGS. 8(a) and 8(b), supplied air flows through the pipe 48a, and also passes through the vent holes defined between the glass beads 70 in the porous layer 54 and then the vent holes defined between the steel balls 72 in the porous layer 58. The air then flows out of the porous layer 58 into the clearance K to press the unit sheet S gripped between the first and second mold dies 40, 46 against the embossing surface 66 of the porous electroformed body 68 (see FIG. 21c and STP3 in FIG. 22).

Since the porous layer 58 has a countless number of communication or vent holes therein, the unit sheet S is pressed under the uniform air pressure applied to the entire surface thereof against the embossing surface 66 of the porous electroformed body 68 of the second mold die 46. The foamed construction of the unit sheet S is thus prevented from being locally deformed or crushed, so that the desired embossed pattern can well be transferred from the embossing surface 66 to the unit sheet S even if the embossing pattern is complex.

After elapse of a predetermined period of time, the vacuum pump is actuated to evacuate the vacuum tank 50 in the upper surface plate 36. As a result, the unit sheet S is attracted by the vacuum tank 50 through the holes 68c, 68b in the porous electroformed body 68, the vent holes in the porous layers 64, 60, and the suction pipe 50a (see FIG. 21d and STP4 in FIG. 22). Because the second mold die 46 has a countless number of minute communication or vent holes therein, the unit sheet S is attracted to the embossing surface 66 under a substantially uniform pressure. The unit sheet S is pressed against even the steep undercut surface portions 52a, 52b, with the consequence that the embossed pattern will reliably be transferred from the embossing surface 66 to the unit sheet S. After the embossing pattern has fully been transferred to the unit sheet S, which is thus formed as a covering sheet 12, the supply of air under pressure to the first mold die 40 is stopped in STP5 in FIG. 22, then the evacuation of the second mold die 46 is stopped in STP6, and the second mold die 46 is vented to atmosphere in STP7.

With the second mold die 46 vented to atmosphere, the embossed unit sheet S can easily be released from the first and second mold dies 40, 46.

The loading carriage 116 is operated by the cylinder 142 to run from the first rails 114 onto the lower rails 232 in the heating device 192, in which the loading carriage 116 is readied for carrying a next unit sheet S.

Figure 10:
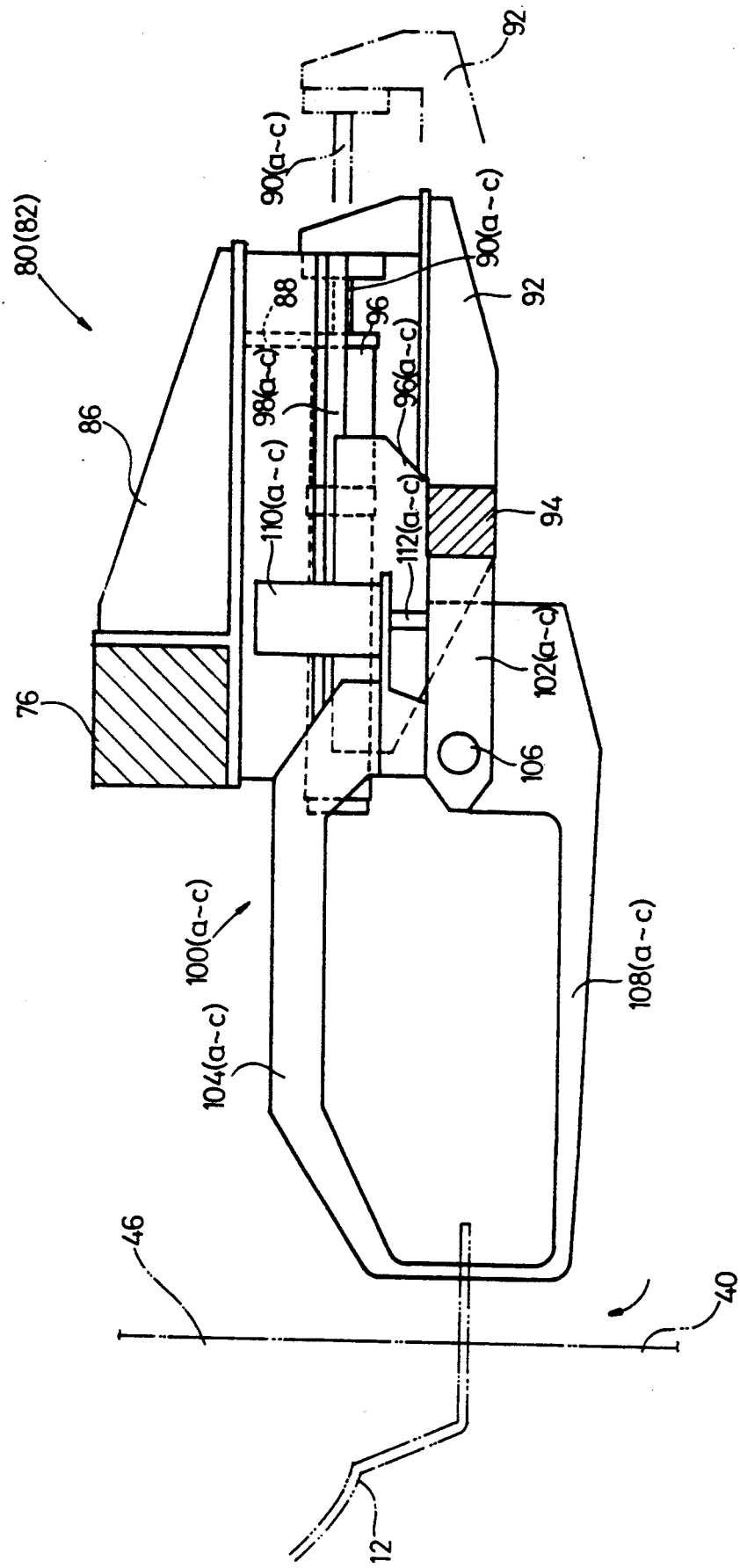
FIG. 10 is a side elevational view, partly in cross section, of the gripping means illustrated in FIG. 9.

In FIGS. 9 and 10, the cylinders 110a through 110c of the sheet clamps 100a through 100c of the gripping means 80, 82 are actuated to turn the second clamp arms 108a through 108c in the direction indicated by the arrows until an end of the covering sheet 12 is gripped by the tip ends of the first clamp arms 104a through 104c and the second clamp arms 108a through 108c.

The first and second mold dies 40, 46 are moved away from each other, and the covering sheet 12 is removed from between the first and second mold dies 40, 46 (STP8).

As shown in FIG. 6, the covering sheet 12 can be removed by displacing the die ram 42 and the frame ram 76 at different speeds, e.g., by lifting the frame ram 76 at a speed which is half the speed at which the die ram 42 is lifted. More specifically, the frame ram 76 is lifted at a speed lower than the die ram 42 by controlling the rate of flow of oil supplied under pressure to the hydraulic cylinder 43 and the rate of flow of oil supplied under pressure to the hydraulic cylinder 78. Since the distance between the second mold die 46 held by the die ram 42 and the gripping means 80, 82 held by the frame ram 76 and gripping the covering sheet 12 is progressively increased at this time, the covering sheet 12 can automatically and reliably be removed from the second mold die 46. The second mold die 46 and the frame ram 76 are finally stopped in the positions shown in FIG. 6.

Then, the covering sheet 12 is placed on the unloading carriage 156 and unloaded from the apparatus. As shown in FIG. 7, the unloading carriage 156 is moved along the second rails 154 and then the first rails 114 of the frame ram 76 to a position below the second mold die 46. The arms 166a through 166d which have been directed parallel to the members 160 to avoid interference with the sheet clamps 100a through 100c are turned in the direction indicated by the arrows by the motors 168a through 168c to bring the holder bars 170a through 170d on the distal ends of the arms 166a through 166d into a position suitable to receive the covering sheet 12 (see FIG. 15). The cylinders 110a through 110c are then operated to move the second clamp arms 108a through 108d away from the first clamp arms 104a through 104d, thereby letting the covering sheet 12 drop onto the unloading carriage 156.

At this time, the covering sheet 12 is supported by the holder bars 170a through 170d which serve as a means for maintaining the configuration of the covering sheet 12. Since the covering sheet 12 is of a high temperature and poor in rigidity immediately after it has been removed from the mold dies 40, 46, if the covering sheet 12 fell directly on the unloading carriage 156, the covering sheet 12 would be deformed and remain deformed upon a temperature drop, resulting in a defective product. The jigs or holder bars 170a through 170d on the unloading carriage 156 in the illustrated embodiment serve as the means for maintaining the configuration of the covering sheet 12, so that the above drawback will be eliminated. The means for maintaining the configuration of the covering sheet 12 may be air jets ejected from the distal ends of the arms 166a through 166d. The air thus supplied from the arms 166a through 166d is also effective to cool the covering sheet 12.

Thereafter, the unloading carriage 156 is moved along the first rails 114 and the second rails 154 to their terminal ends, whereupon the discharging device 172 is operated to discharge the covering sheet 12 onto the conveyor 174.

More specifically, as shown in FIG. 16, the piston rod 178a of the cylinder 178 is extended to turn the discharging arm 176 about the support shaft 182 toward the conveyor 172. The covering sheet 12 which has been supported by the holder bars 170a through 170d is now lifted from below by the discharging arm 176. As the discharging arm 176 is tilted through a large angle, the covering sheet 12 slides down along the discharging arm 176 onto the conveyor 174. Then, the covering sheet 174 is fed by the conveyor 174 to a next process, i.e., to the first forming device 250 for the first foaming process.

In the first forming device 250, the upper mold die 272 has been elevated, coated with a parting agent, and the brackets 22 of the first component 16 are attracted to the magnet 280. The covering sheet 12 which has been fed from the covering sheet forming device 30 is 180° reversed or turned upside down so that the embossed surface thereof is directed downwardly and the covering sheet 12 is held in close contact with the lower mold die 260 and the side mold dies 262a, 262b by the covering sheet positioning device 330. More specifically, one of the pipes 336 of the frame 332 of the covering sheet positioning device 330 is gripped by the operator, and the pressers 342 of the profile member 340 are placed in alignment with certain portions of the covering sheet 12. At this time, as shown in FIG. 19, the presser 342a having a sharply angular shape faces the attachment region A of the covering sheet 12. Therefore, the presser 342a is held against the reverse side of the covering sheet 12 at the attachment region A, and the pressers 342b, 342c are held against their corresponding regions of the covering sheet 12. Under this condition, the frame 332 is pressed against the lower mold die 260. The pressers 342 are reliably pressed against the desired regions of the covering sheet 12, e.g., the presser 342a is pressed against the attachment region A, so that the covering sheet 12 is accurately held intimately against the lower mold die 260 and the side mold dies 262a, 262b.

As shown in FIG. 2a, the covering sheet 12 is considerably complex in shape. If the covering sheet 12 were to be manually held against the lower mold die 260 and the side mold dies 262a, 262b directly by fingers of the operator, it would be highly tedious and time-consuming to set the covering sheet 12 in place. No finger of the operator could be inserted against a sharply angular region such as the attachment region A, leaving an unwanted gap between the covering sheet 12 and the lower mold die 260.

However, the covering sheet positioning device 330 has a plurality of pressers 342 complementary in shape to the covering sheet 12, which pressers will enable the regions of the covering sheet 12 to be intimately and reliably held against the lower mold die 260 and the side mold dies 262a, 262b simply by pressing the frame 332 against the lower mold die 260 with the aid of the operator. Accordingly, the covering sheet positioning device 330 does not suffer from the problem of differently pressed conditions of the covering sheet 12 which would otherwise be caused by the operator who would use his fingers for pressing the covering sheet 12, and also from the formation of wrinkles or other defects which would otherwise result from gaps between the covering sheet 12 and the lower mold die 260 and the side mold dies 262a, 262b. The covering sheet 12 can thus be set in place highly accurately in a short period of time, with the result that a trim member 10 of high quality can efficiently be manufactured by the first and second forming devices 250, 350.

Inasmuch as the presser 342 which will be positioned in direct contact with the covering sheet 12 are made of a soft material such as urethane elastomer, for example, the covering sheet 12 are not damaged or broken by the pressers 342 when the covering sheet 12 is pressed by the covering sheet positioning device 330.

The frame 332, the support pipes 338, and the profile member 340 of the covering sheet positioning device 330 are made of a resin material. Therefore, the covering sheet positioning device 330 is lightweight as a whole, and can be handled with ease.

While the covering sheet 12 is being pressed against the lower mold die 260 and the side mold dies 262a, 262b by the covering sheet positioning device 330, a suction mechanism (not shown) disposed in the lower mold die 260 is operated to attract the covering sheet 12 against the lower mold die 260. After the covering sheet positioning device 330 is displaced upwardly, the covering sheet 12 therefore remains in intimate contact with the lower mold die 260 and the side mold dies 262a, 262b.

As shown in FIG. 17, after the upper mold die 272 has been lowered, the cylinders 284 of the clamp means 282 are operated to displace the piston rods 286 outwardly. The swingable arms 288 connected to the piston rods 286 are angularly moved about the support pins 290 to cause the rollers 292 against the inner wall surfaces of the engaging members 294 on the side mold dies 262a, 262b, thus clamping the mold die assembly of the first forming device 250. At this time, the first component 16 (FIG. 2a) is disposed at a predetermined location on the covering sheet 12.

Then, a solution of foam resin such as a solution of a hard urethane foam resin is supplied from the nozzle 278 through the passage 276 in the first forming device 250 into the cavity 274 until the cavity 274 is filled up. The supplied solution is then foamed by heating the cavity 274, thereby forming a first foamed body 14 on the reverse side of the covering sheet 12. Since the first component 16 is held on the upper mold die 272 by the magnet 280, a portion of the first component 16 is embedded in the first foamed body 14 as shown in FIG. 2b. At this time, a rib 14a and an attachment base 14b for positioning the second component 20 are formed on the first foamed body 14.

After an intermediate body 10a, which is composed of the covering sheet 12, the first foamed body 14, and the first component 16, has been integrally formed, the mold die assembly of the first forming device 250 is opened. More specifically, the cylinders 284 of the clamp means 282 are actuated to displace the piston rods 286 inwardly to move the rollers 292 out of engagement with the engaging members 294. The upper mold dies 272 are elevated, and the cylinders 268a, 268b on the base 258 are operated to displace their piston rods 270a, 270b in a direction to angularly move the side mold dies 262a, 262b away from each other against the resilient forces of the springs 266a, 266b. The suction mechanism in the lower mold die 260 is inactivated, and the intermediate body 10a is removed from the first forming device 250 by a feed means (not shown).

Since the upper mold die 272 is coated with the parting agent to allow the intermediate body 10a to be easily separated from the mold die assembly, as described above, the parting agent tends to be attached to the intermediate body 10a. Therefore, the intermediate body 10a which has been removed from the first forming device 250 is delivered to the blasting device (not shown) in which the parting agent is blasted off from the first foamed body 14 of the intermediate body 10a.

Then, the intermediate body 10a is delivered from the blasting device to the second forming device 350 for the second foaming process. In the second forming device 350, the upper mold die 272a has been lifted. The intermediate body 10a is first placed on the lower mold die 260 and the side mold dies 262a, 262b. The second component 20 including the instrument back box 24, the clock box 26, and the side duct 28, all made of a resin material, is placed on the first foamed body 14. More specifically, as shown in FIG. 2c, the instrument back box 24 is placed on the rib 14a and the attachment base 14b. Thereafter, the upper mold die 272a is lowered to close the mold die assembly of the second forming device 350.

Thereafter, a solution of hard urethane foam resin is poured from the nozzle 278 into the cavity 396, which is then heated to form a second foamed body 18 integrally with the intermediate body 10a, whereupon the second component 20 such as the instrument back box 24 is partly embedded in the second foamed body 18. As shown in FIG. 20, the solution of hard urethane foam resin is prevented from leaking into undesirable regions by seal members M attached to the instrument back box 24. The second component 20 is accurately positioned by the rib 14a and the attachment base 14b.

Then, the mold die assembly of the second forming device 350 is opened, and a molded body 10b, which is composed of the covering sheet 12, the first foamed body 14, the first component 16, the second foamed body 18, and the second component 20, is removed from the mold die assembly. The ends of the molded body 10b and the opening thereof are trimmed by a trimming device (not shown), whereupon a trim member 10 is completed as a product.

With the above embodiment, the covering sheet 12 having a predetermined three-dimensional configuration and an embossed pattern surface is placed in the first forming device 250, and while the first component 16 in the form of a magnetic metallic material is being held on the upper mold die 272 by the magnet 280, the intermediate body 10a composed of the covering sheet 12, the first foamed body 14, and the first component 16 is formed in the first foaming process. After the remaining parting agent has been blasted off the intermediate body 10a, it is delivered to the second forming device 350, the second component 20 of a resin material is placed on the intermediate body 10a, and the molded body 10b is formed in the second foaming process. The molded body 10b is thereafter trimmed into the trim member 10 for use in a motor vehicle.

The first and second components 16, 20 such as the brackets 22 and the various boxes 24, 26, which have heretofore been installed by screws or the like are molded in the first and second foamed bodies 14, 18 when the latter are molded. Therefore, these components can easily be attached without the need of manual labor and complex procedure which would otherwise be required if screws or other fasteners were employed. Consequently, the process of manufacturing the trim member 10 is highly simplified and made efficient, so that the entire process can easily be automated.

The rigidity of the trim member 10 as a whole can be maintained by the first and second foamed bodies 14, 18 of hard urethane foam resin, without using any cores and screws. The trim member 10 is thus lightweight in its entirety.

The trim member 10 is also advantageous in that it will not squeak while the motor vehicle is running since it is of a unitary construction, rather than composed of joined sections. The trim member 10 is thus effective in making the passenger compartment more quiet during travel of the motor vehicle. As no visible joints or steps are present on the surface of the trim member 10, the trim member 10 looks rich, sophisticated, and heavy.

The synthetic resin sheet used as the covering sheet has been described as a laminated synthetic resin sheet including a foamed body of polypropylene or the like. However, the present invention is also applicable to a single synthetic resin sheet. The porous layers having many minute holes or interstices and serving as reinforcements, and the porous layers having the temperature regulating pipes may be replaced with porous resin layers. The air tank and the vacuum tanks in the forming device may be switched around in position.

Figure 24:
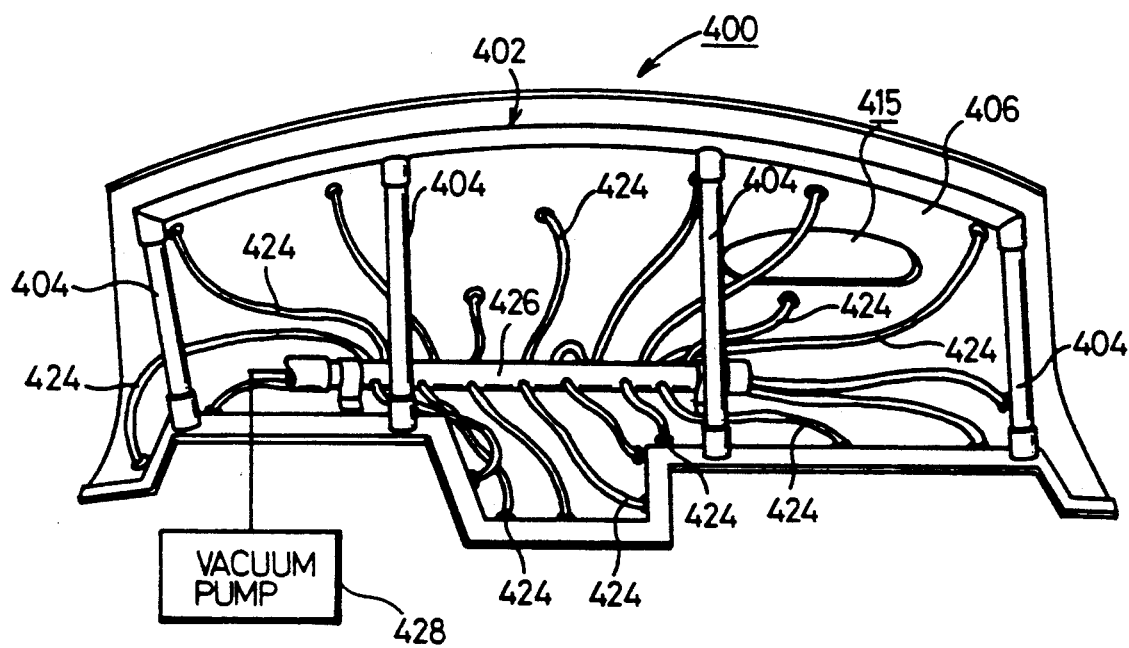
FIG. 24 is a rear elevational view of the covering sheet positioning device shown in FIG. 23.
Figure 25:
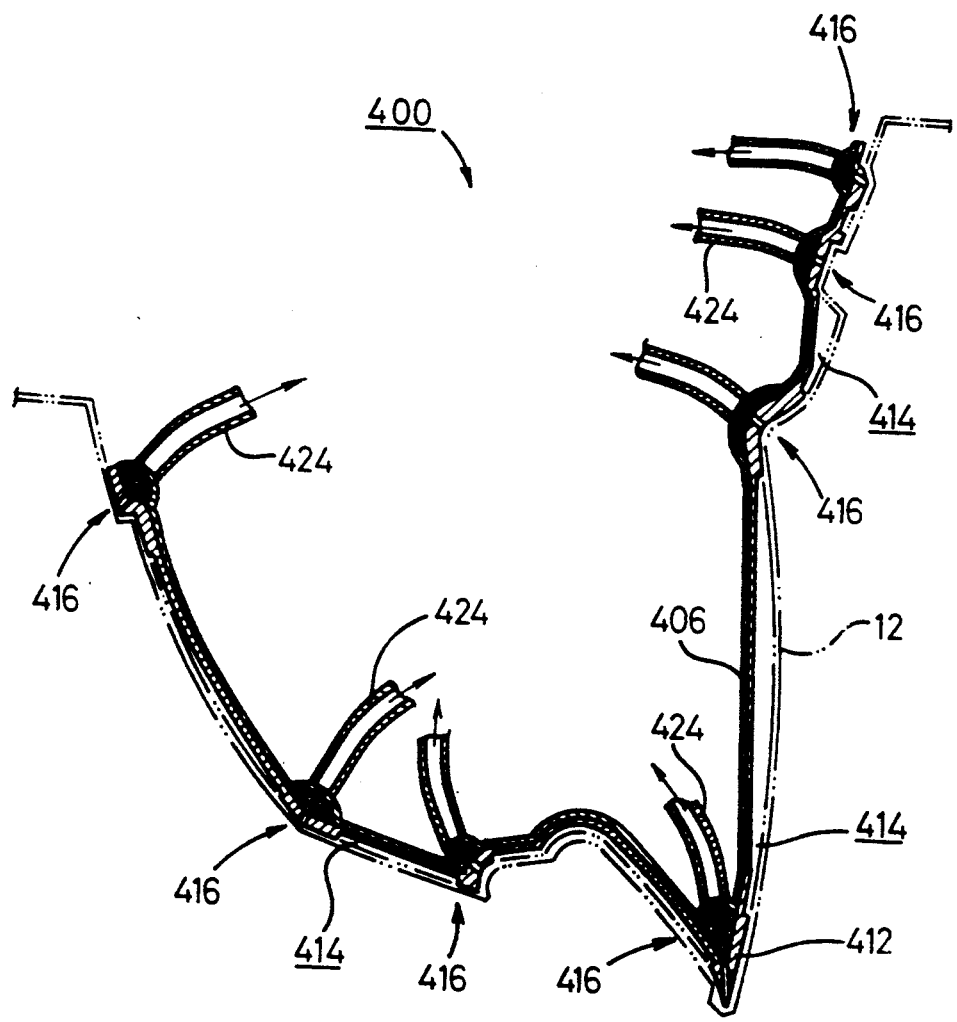
FIG. 25 is a vertical cross-sectional view of the covering sheet positioning device illustrated in FIG. 23.

A covering sheet positioning device 400 according to another embodiment is shown in FIGS. 23 through 26. The covering sheet positioning device 400 has a frame 402 comprising four pipes 404 which extend substantially parallel to each other as shown in FIG. 24. The frame 402 is made of a resin material. Any one of the pipes 404 will be gripped by the operator during operation of the covering sheet positioning device 400. A profile member 406 which is substantially complementary in shape to the covering sheet 12 is directly supported on the frame 402.

The profile member 406 has a first, substantially arcuate projecting portion 408a complementary in shape to the attachment region A, and a second, box-shaped projecting portion 408b corresponding to the storage box C. The profile member 406 also has a recess 410 positionally corresponding to the glove box D.

A plurality of pressers 412 for pressing the reverse side of the covering sheet 12 are attached to the profile member 406 at predetermined areas thereon. The pressers 412 are made of a relatively soft material such as a urethane elastomer. A clearance 414 is defined between adjacent two of the pressers 412. The profile member 406 also has a leakage opening 415 and a plurality of holes (not shown) defined therein.

Figure 26:
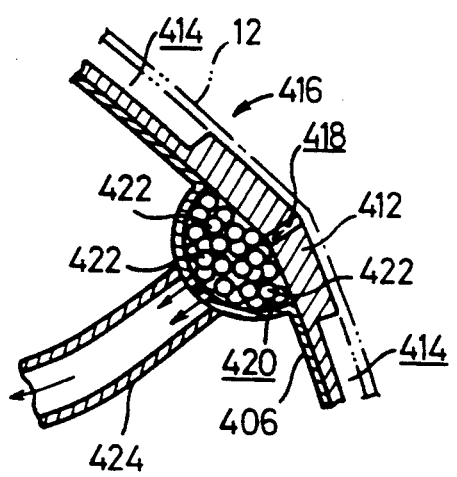
FIG. 26 is an enlarged fragmentary cross-sectional view of a portion of the covering sheet positioning device shown in FIG. 25.

Each of the pressers 412 is associated with a suction means 416. More specifically, as shown in FIG. 26, each of the pressers 412 has a small-diameter suction hole 418 opening outwardly and communicating with an opening 420 defined between the presser 412 and the profile member 406. The opening 420 is filled up with beads of styrene or epoxy resin, thus forming a porous resin layer 422. A pipe 424 has one end connected to the profile member 406 in communication with the opening 420. The other end of the pipe 424 is connected to a pipe 426 of a resin material (FIG. 24) which is positioned in the profile member 406 and fixed to the frame 402 in close positional relation thereto. The pipe 426 communicates with a vacuum pump 428.

The pipes 424 of the suction means 416 of the pressers 412 are connected to the common pipe 426. The pipes 426 may be dispensed with, and the frame 402 itself may be used as a suction pipe.

The covering sheet positioning device 400 is basically constructed as described above. Operation and advantages of the covering sheet positioning device 400 will be described below.

After a covering sheet 12 has been formed to a predetermined shape, its reverse side is held in engagement with the covering sheet positioning device 400. At this time, the pressers 412 abut against bent or narrow portions or regions of the covering sheet 12. Then, the suction means 416 of the respective pressers 412 are operated.

More specifically, the vacuum pump 428 connected to the common pipe 426 joined to the pipes 424 of the suction means 416 is operated to evacuate the pipes 424. Therefore, air in the suction holes 418 is drawn in through the openings 420 to attract the portions of the covering sheet 12 which are engaged by the pressers 412 toward the pressers 412 through the suction means 416. Since the porous resin layer 422 is disposed in the opening 420, a vacuum pressure which is excessively high is prevented from acting in the suction hole 418, and hence the covering sheet 12 is not unduly deformed.

When the covering sheet 12 is attracted to the pressers 412, air present between the covering sheet 12 and the profile member 406 is discharged out through the opening 415 and other holes (not shown) defined in the profile member 406. The covering sheet 12 is thus reliably attracted to and held by the pressers 412.

Thereafter, the operator grips a desired one of the pipes 404 of the frame 402, and displaces the covering sheet 12 attracted to the covering sheet positioning device 400 toward the first forming device 250. After the surface of the covering sheet 12 which is attracted to and held by the covering sheet positioning device 400 is pressed intimately against the corresponding surfaces of the lower mold die 260 and the side mold dies 262a, 262b of the first forming device 250, the vacuum pump 428 connected to the pipe 426 is inactivated. The suction mechanism (not shown) in the lower mold die 260 is then actuated to attract the covering sheet 12 to the lower mold die 260. Then, the covering sheet positioning device 400 is moved away from the lower mold die 260 and the side mold dies 262a, 262b. Since the covering sheet 12 is no longer attracted to the covering sheet positioning device 400, the covering sheet 12 is released from the covering sheet positioning device 400 while being held in intimate contact with the lower mold die 260 and the side mold dies 262a, 262b.

The covering sheet positioning device 400 can set the covering sheet 12 of a complex shape easily and quickly in the first forming device 250. Before the covering sheet 12 is placed in the first forming device 250, the covering sheet 12 is attracted to the covering sheet positioning device 400 by the suction means 416. Consequently, the configuration of the surface of the covering sheet 12 can be confirmed by the operator before it is set in the first forming device 12, so that a trim member 10 of better quality can be manufactured.

Each of the pressers 342 of the covering sheet positioning device 330 of the previous embodiment may be equipped with the same suction means as the suction means 416, and the frame 332 and the support pipes 338 of the covering sheet positioning device 330 may be used as suction pipes.

Figure 27:
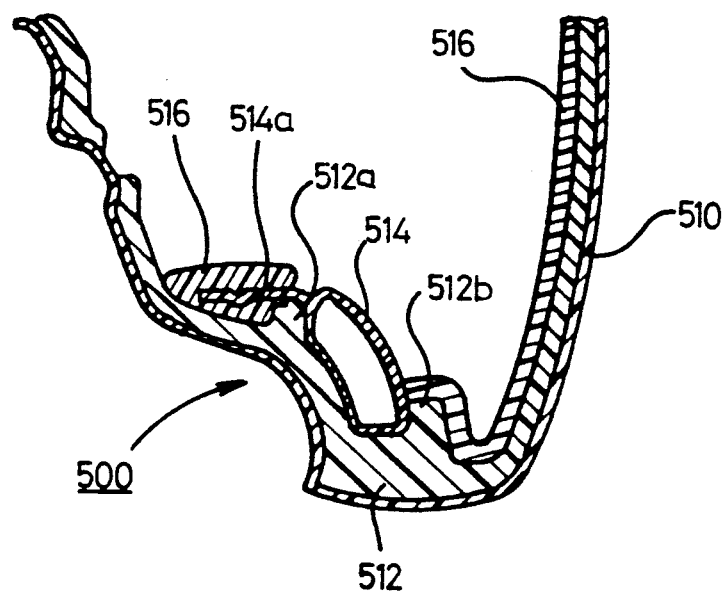
FIG. 27 is a cross-sectional view of a motor vehicle trim member according to another embodiment of the present invention.

FIG. 27 shows a motor vehicle trim member 500 in accordance with another embodiment of the present invention. The trim member 500 comprises a covering sheet 510 made of vinyl chloride or the like, a first foamed body 512 made of a foam resin, a component 514 such for example as a duct for passage of cooling or warming air, or a case for attachment of an air-conditioning unit, and a second foamed body 516 made of a foam resin. The covering sheet 510 has an outer surface having an embossed pattern which gives an impression of leather or the like. The first foamed body 512 has positioning ribs 512a, 512b for positioning the component 514 in place. The covering sheet 510 has a predetermined three-dimensional configuration. The first foamed body 512 is foamed on the covering sheet 510 by a foaming device (described later on). The component 512 is placed on the first foamed body 512 so as to be positioned by the positioning ribs 512a, 512b.

The component 514 has a projection 514a positioned in spaced relation to the first foamed body 512. Preferably, a urethane foam is poured near the component 514 and around the projection 514a, thereby forming the second foamed body 516.

The foamed bodies 512, 516 are of a double-walled construction, with the second foamed body 516 surrounding the projection 514a. The body of the component 514 is sandwiched between the first and second foamed bodies 512, 516, and the projection 514a is held by only the second foamed body 516.

Figure 28:
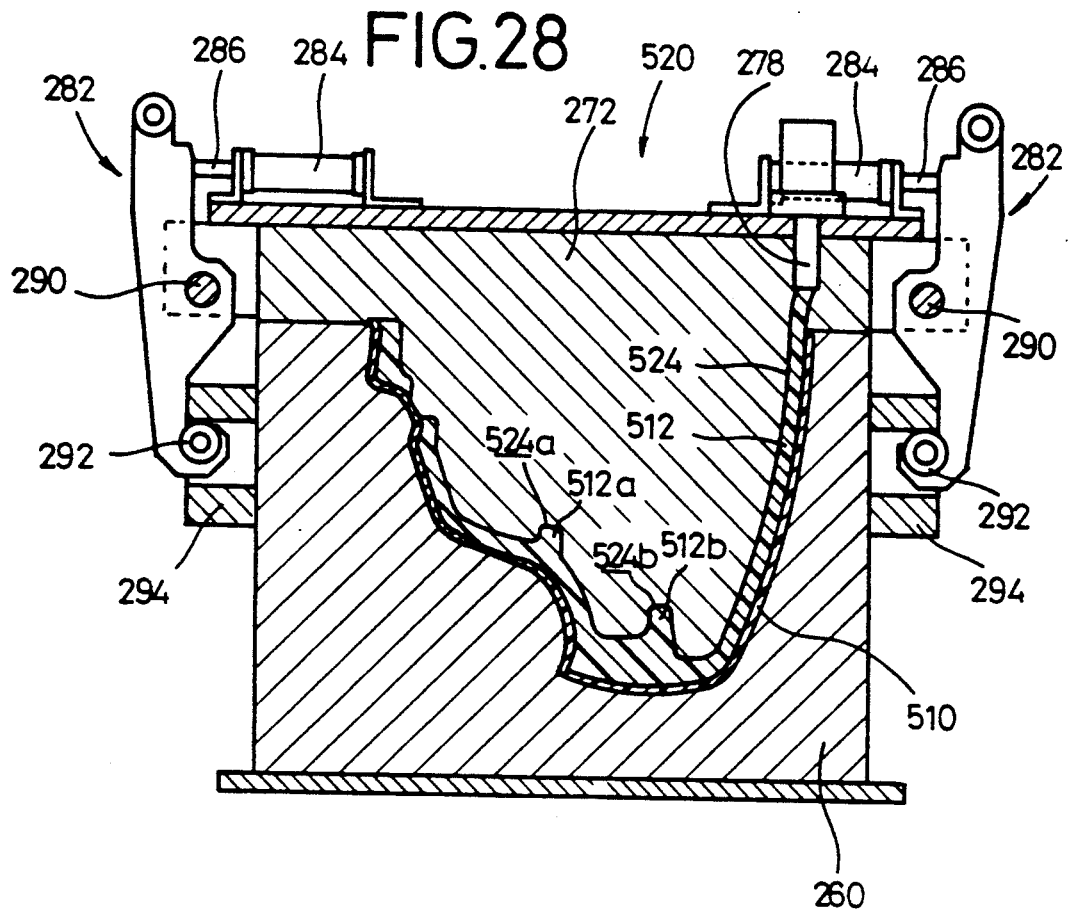
FIG. 28 is a vertical cross-sectional view of a first forming device used in a first foaming step of a method of manufacturing the trim member shown in FIG. 27.
Figure 29:
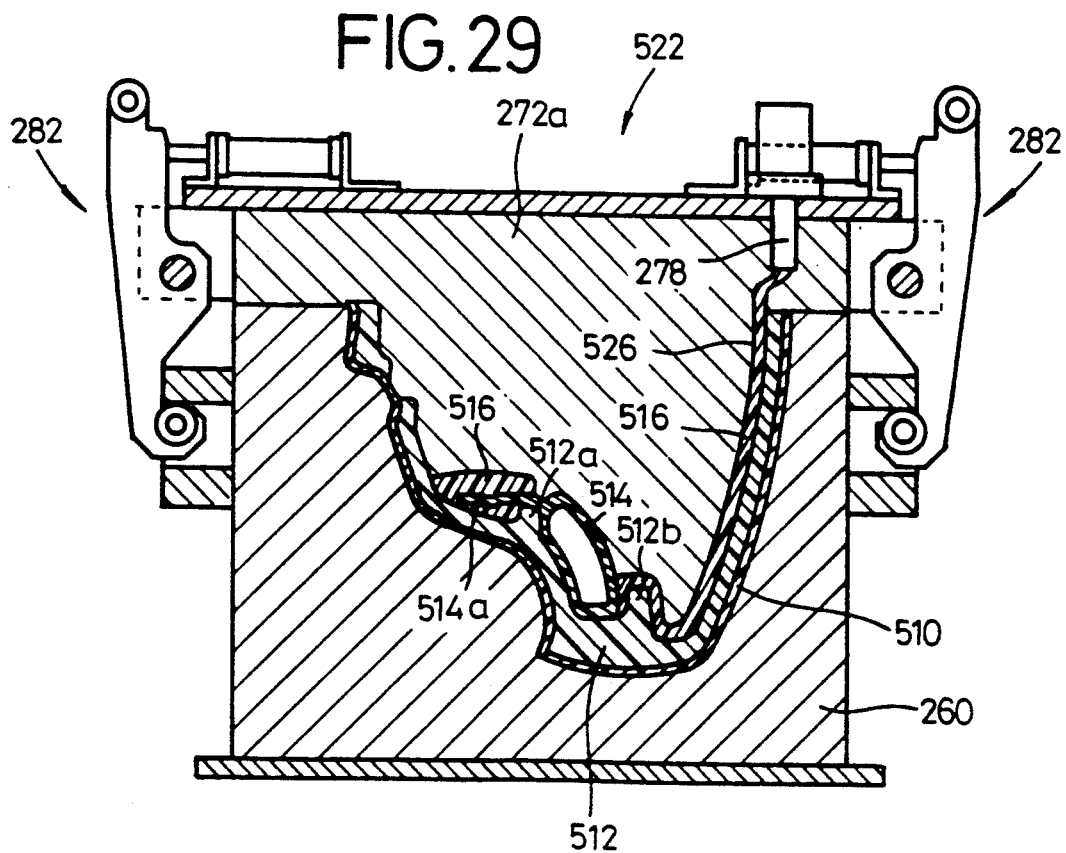
FIG. 29 is a vertical cross-sectional view of a second forming device used in a second foaming step of the method of manufacturing the trim member shown in FIG. 27.

The first and second foamed bodies 512, 516 are formed by first and second forming devices 520, 522, respectively, which are shown in FIGS. 28 and 29. Those parts of the forming devices 520, 522 which are identical to those of the first and second forming devices 250, 350 shown in FIGS. 17 and 20 are designated by identical reference numerals, and will not be described in detail.

As shown in FIG. 28, a cavity 524 for forming the first foamed body 512 having the positioning ribs 512a, 512b is defined between the lower mold die 260 and the upper mold die 272 when the first forming device 520 with the covering sheet 510 set therein is locked by the clamp means 282. The cavity 524 includes recesses 524a, 524b defined in the upper mold die 272 for forming the positioning ribs 512a, 512b.

As shown in FIG. 29, the upper mold die 272a of the second forming device 522 has a cavity 526 for forming the second foamed body 512 and the nozzle 278 opens into the cavity 526.

In operation, the covering sheet 510 which has been formed in advance is placed on the lower mold die 260 of the first forming device 520, and then the upper and lower mold dies 272, 260 are brought together. At this time, as described above, the cavity 524 for forming the first foamed body 524 having the positioning ribs 512a, 512b is defined between the lower and upper mold dies 260, 272.

Then, a solution of a foam resin is poured into the cavity 524 thereby to form the first foamed body 512 therein. After the mold die assembly of the first forming device 520 has been opened, the covering sheet with the first foamed body 512 formed thereon is removed.

The covering sheet 510 is then placed on the lower mold die 260 of the second forming device 522, and the attachment 514 is positioned in alignment with the positioning ribs 512a, 512b of the first foamed body 512 as shown in FIG. 29.

The mold die assembly of the second forming device 522 is closed, and a solution of a foam resin is poured into the cavity 526 to thereby forming the second foamed body 516 near the positioning ribs 512a, 512b, which embeds the projection 514a of the component 514 therein. The trim member 500 which is now completed as a product is then removed from the second forming device 522, and then delivered to a next assembly line.

The component 514 of the trim member 500 thus fabricated is held in position by the positioning ribs 512a, 512b, and partly covered integrally by the second foamed body 516. Therefore, the component 512 is prevented from being positionally displaced, and the trim member 500 is thus of high quality.

FIGS. 30a and 30b illustrate a motor vehicle trim member according to still another embodiment of the present invention. A trim member 570 comprises a covering sheet 571 made of vinyl chloride or the like, a first foamed body 572, a component 574, seal members 576 made of a resilient material, and second foamed bodies 578. The first foamed body 572 has a step 572a and a rib 572b for positioning the component 574. The component 574 has an end portion 574a and a flat surface 574b for mating engagement with the step 572a and the rib 572b, respectively, of the first foamed body 172. One of the resilient seal members 576 is interposed between the end portion 574a of the component 574 and the step 572a of the first foamed body 572, and one of the second foamed bodies 578 is formed on the step 572a. The other resilient seal member 576 is interposed between the rib 572b of the first foamed body 572 and the flat plate 574b of the component 574, and the other second foamed body 578 is formed near the rib 572b in covering relation to the distal end of the flat plate 574b.

The trim member 570 of the above structure is manufactured in the same manner as described above. More specifically, with the seal members 576 placed on the step 572a and the rib 572b which have been formed in the first foaming process, the end portion 574a and the flat plate 574b of the component 574 are placed on the seal members 576. These members are clamped between mold dies (not shown). Then, a solution of a foam resin is poured to form the second foamed bodies 578 (FIG. 30b) near the end portion 574a, the flat plate 574b, and the rib 572b. Since the resilient seal member 576 is interposed between the end portion 574a and the step 572a, the foam resin solution is prevented from leaking from between the end portion 574a and the step 572a when the solution is poured.

Since the seal member 576 is also interposed between the flat plate 574b and the positioning rib 572b, the foam resin solution which will embed the engaging portions of the rib 572b and the component 574 is prevented from leaking out. Consequently, after the second foamed body 578 has been formed in the second foaming process, it is not necessary to finish the second foamed body 578 since the second foamed body 578 is free of any unwanted burrs. The component 574 is supported by the resilient seal members 576, strains applied by external forces are absorbed by the seal members 576. After the completed trim member 570 has been installed in a motor vehicle, therefore, the trim member 570 will not squeak even if the motor vehicle vibrates while running.

Figure 31:
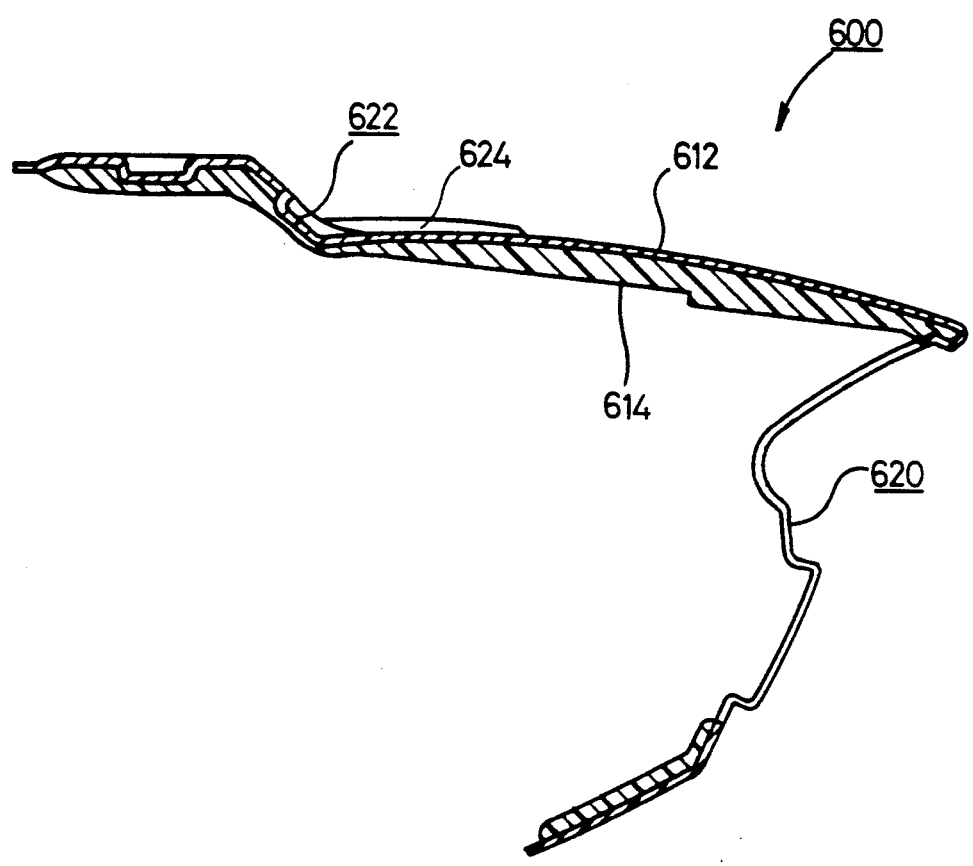
FIG. 31 is a cross-sectional view of a motor vehicle trim member according to still another embodiment of the present invention.

A method of manufacturing a trim member for a motor vehicle according to another embodiment of the present invention will be described below. FIG. 31 schematically shows a motor vehicle trim member 600 produced by the method.

The trim member 600 comprises a covering sheet 612 of vinyl chloride or the like serving as a sheet of artificial leather, and a formed body 614 made of a foam resin such as a hard urethane resin. The trim member 600 has spaces or cavities, one indicated as a box 620 for accommodating an air-conditioning unit or an audio set. The trim member 600 has a recess 622 defined in an upper surface thereof for housing a clock (not shown) when the trim member 600 is installed in a front portion of the motor vehicle, and also has a land 624 projecting outwardly for aesthetic purpose. The manufacturing method of this embodiment is aimed at the accurate formation of the recess 622 and the land 624.

Figure 32:
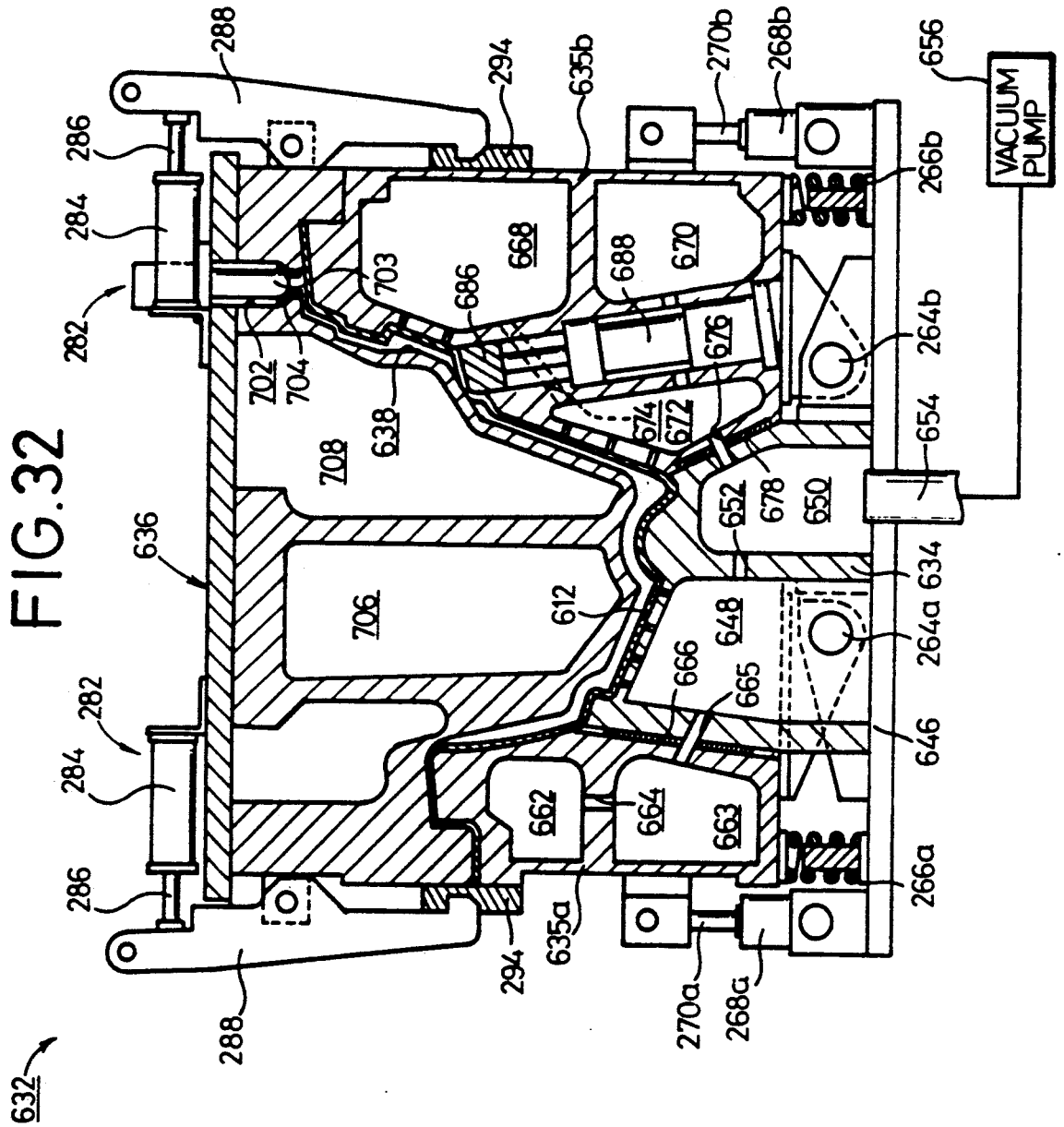
FIG. 32 is a vertical cross-sectional view of a forming device used for manufacturing the trim member shown in FIG. 31.

FIG. 32 shows in cross section a forming device 632 for manufacturing the trim member 60.

The forming device 632 comprises a lower female mold die 634, side mold dies 635a, 635b, and an upper male mold die 636. These mold dies have confronting product forming surfaces that jointly define a cavity 638 complementary in shape to the trim member 600.

The lower mod die 634 is fixedly mounted on a die base 646 and has hollow spaces or cavities 648, 650 defined therein. The cavities 648, 650 communicate with each other through a communication or vent hole 652. A pipe 654 connected to a vacuum pump 656 communicates with the cavity 650. The side mold die 635a has cavities 662, 663 communicating with each other through a communication or vent hole 664. The cavity 663 communicates with the cavity 648 in the lower mold die 634 through a vent hole 665. A packing 666 is interposed between the confronting surfaces of the side mold die 635a and the lower mold die 634 to make the cavities in the side mold die 635a and the lower mold die 634 airtight. Similarly, the side mold die 635b has cavities 668, 670, 672, the cavities 668, 670 communicating with each other through a vent hole 674. The cavity 670 communicates with the cavity 650 in the lower mold die 634 through a vent hole 676. A packing 678 is interposed between the confronting surfaces of the lower mold die 634 and the side mold die 635b.

The mating surfaces, or product forming surfaces, of the lower mold die 634 and the side mold dies 635a, 635b, which define the cavity 638, should preferably be made of a porous electroformed body having a countless number of minutes holes serving as suction holes for attracting the covering sheet 612 under vacuum. However, rather than such a porous electroformed body, the mating surfaces which define the cavity 638 may have suction holes communicating with the cavity 638.

In the side mold die 635b, there are disposed a slide core 686 for adding a certain shape to a molded product, and a cylinder 688 for moving the slide core 686 back and forth.

The upper mold die 636 is vertically displaceable, and has a hole 702 defined in an end thereof. A sprue 704 in which a resin injection head 703 is fitted is mounted in the hole 702. The upper mold die 636 has cavities 706, 708 defined therein so that the upper mold die 636 is reduced in weight.

The other elements of the forming device 632 are identical to those of the first forming device 250 shown in FIG. 17, and denoted by identical reference numerals and will not be described in detail.

The forming device 632 is basically constructed as described above. The manufacturing method of the present embodiment is carried out on the forming device 632 to form the trim member 600. The manufacturing method will be described below with particular emphasis placed on the formation of the recess 622 in the upper surface of the trim member 600.

The covering sheet 612 which has been shaped to a substantial product configuration by another mold die assembly is pressed against the lower mold die 612 and the side mold dies 635a, 635b by the covering sheet positioning device.

Thereafter, the cavities defined in the lower mold die 634 and the side mold dies 635a, 635b are evacuated by the vacuum pump 656. The cavity 650 in the lower mold die 634 communicates with the cavity 648 through the vent hole 652, the cavities 662, 663 in the side mold die 635a communicate with the cavity 648 in the lower mold die 634 through the vent holes 664, 665, and the cavities 668, 672 in the side mold die 635b communicate with the cavity 650 in the lower mold die 634 through the vent holes 674, 676. Therefore, all of these cavities can be evacuated. The covering sheet 612 is now pressed against the mating surfaces of the lower mold die 634 and the side mold dies 635a, 635b under a vacuum pressure developed through suction holes defined in the product forming surface of the lower mold die 634 (see FIG. 34a). Then, the upper mold die 636 is lowered until the mold die assembly composed of the upper mold die 636, the lower mold die 634, and the side mold dies 635a, 635b is closed.

Figure 33A:
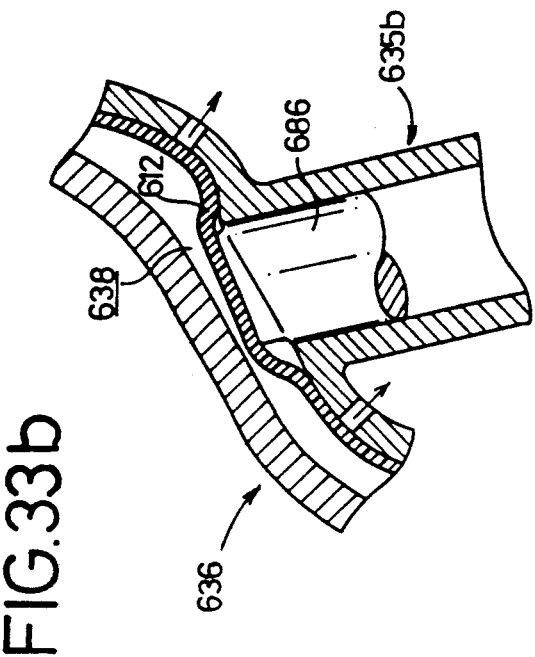
FIGS. 33a through 33d are enlarged fragmentary cross-sectional views illustrating steps of adding a recessed shape using a slide core in the forming device shown in FIG. 32.
Figure 33B:
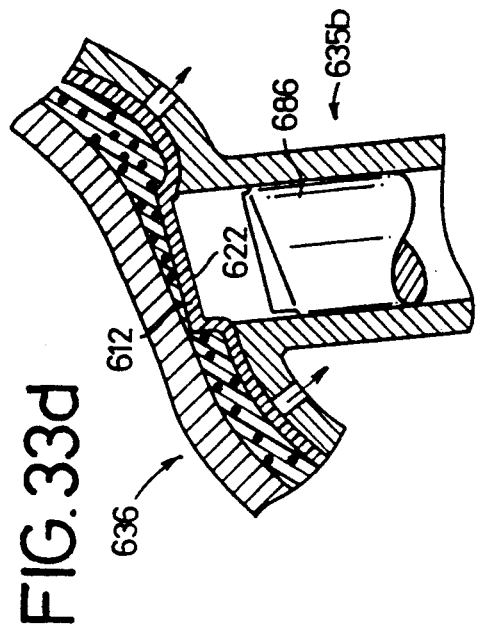

As shown in FIG. 33b, the slide core 686 is moved into the cavity 638 by the cylinder 688 to displace a portion of the covering sheet 612 off the product forming surface.

Figure 33C:
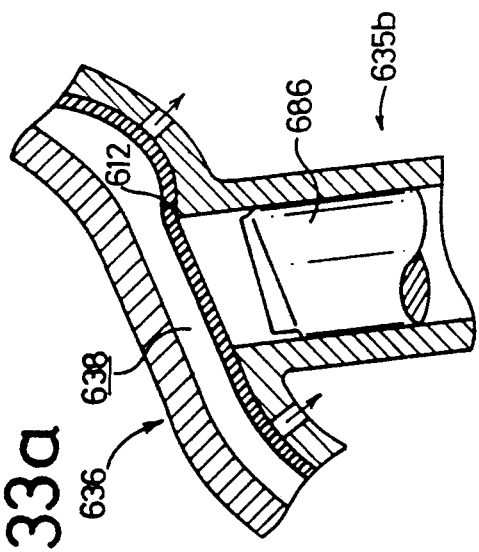

Thereafter, the cavity 638 is filled with resin materials. In this case, a solution of polyol and diisocyanate is poured from the injection head 703 to form a foamed body o hard polyurethane. After the tip of the injection head 703 is fitted in the sprue 704, the solution of polyol and di-isocyanate is injected under a certain pressure from the injection head 703. The solution is filled in the cavity 638 while its resin materials are being mixed with each other. The solution is foamed by the mixing of these two resin materials. As shown in FIG. 33c, the covering sheet 612 is brought into close contact with the slide core 686 under the pressure of carbon dioxide which is produced in the foaming reaction. The foamed resin materials are then allowed to be hardened while the above condition is being kept over a predetermined period of time. As a result, the recess 622 is shaped accurately by the configuration of the tip of the slide core 686.

Figure 33D:
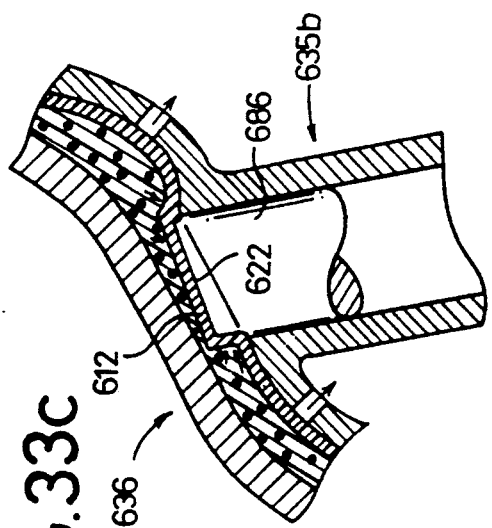

After the resin materials have been hardened, the slide core 686 is retracted downwardly in FIG. 33d, and the mold die assembly is opened and the completed trim member 600 is taken out.

Figure 34B:
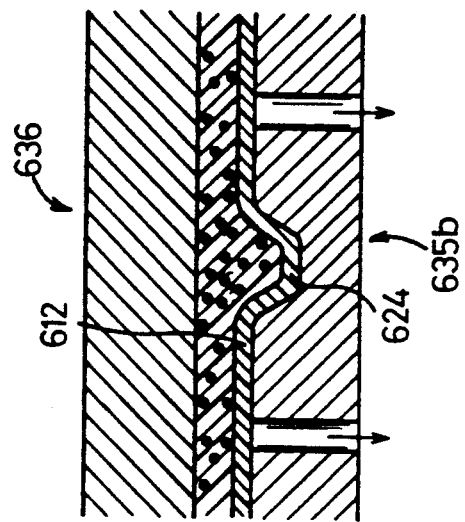
FIGS. 34a and 34b are fragmentary cross-sectional views illustrating steps of adding a recessed shape using a recess in a forming surface of a female mold member in the forming device shown in FIG. 32.
Figure 34A:
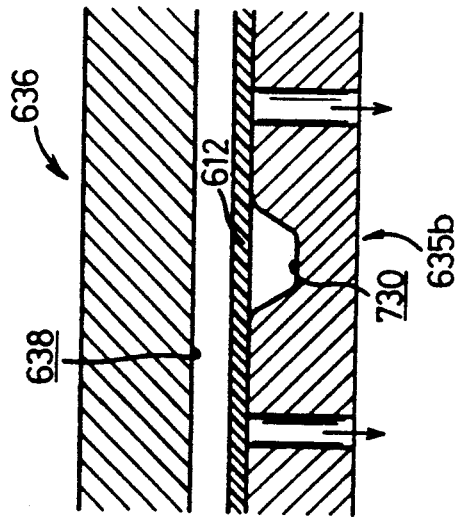

In the above description, the slide core 686 is moved into the cavity 638 to form the recess 622 in the product. On the other hand, the land 624 shown in FIG. 31 may be formed on the upper surface of the trim member 600 as follows: As shown in FIGS. 34a and 34b, a recess 730 is defined in the product forming surface of the side mold die 635b, for example. After the mold die assembly has been closed, the foam resin solution is poured, and the covering sheet 612 is held in intimate contact with the inner wall surface of the recess 730 under the pressure of carbon dioxide generated when the resin materials are foamed. After the resin materials have been hardened, the land 624 complementary to the recess 730 is formed.

With the present invention, as described above, the covering sheet complementary in shape to a motor vehicle trim member to be produced and having an embossed pattern surface is formed, the first component such as brackets is molded in the covering sheet in the first foaming process, and the second component such as a duct, a box, etc. are molded in the covering sheet in the second foaming process, thereby producing the motor vehicle trim member. Since the trim member is integrally formed as a unitary product, the entire manufacturing process is automatically carried out much more efficiently than would be if components such as brackets, ducts, boxes, etc. were fixed by screws or the like. The unitary trim member will not squeak during travel of the motor vehicle unlike conventional trim members which are made up of joined separate sections, and looks rich, sophisticated, and heavy as there are no joints or steps on the surfaces. The trim member is also light in weight since its desired rigidity is provided by foamed bodies themselves rather than cores.

Furthermore, the mold die assembly after having molded a covering sheet is opened by displacing the frame ram carrying the gripping mean which grip the covering sheet at a speed lower than the die ram holding the movable die, so that the completed covering sheet can automatically be removed from the mold die assembly. Inasmuch as the covering sheet is separated automatically in synchronism with operation of the covering sheet forming device, the covering sheet can be very efficiently removed.

The loading carriage for loading the covering sheet and the unloading carriage for unloading the covering sheet can alternately be moved into and out of the covering sheet forming device along the common rails on the frame ram. Thus, the mechanism for feeding the covering sheet is compact in size.

The unloading carriage for unloading the covering sheet has jigs for preventing the covering sheet from being deformed immediately after the covering sheet is removed from the mold die assembly. Accordingly, the covering sheet can be unloaded safely without damage.

Moreover, a covering sheet blank of synthetic resin which has been heated is clamped between the first and second mold dies. Then, air under pressure is supplied into one of the mold dies to press the blank against the other mold die, and thereafter the blank is attracted under vacuum to the other mold die, so that the pressure applied to the blank is substantially uniformized. Therefore, an embossed pattern can well be transferred to the blank irrespective of the configurations of the mold dies. The first and second mold dies have a countless number of vent or communication holes. This arrangement is effective in preventing a foamed resin material from being locally crushed. Heretofore, auxiliary communication holes provided in one of the mold dies have been responsible for locally crushing a foamed resin material. The trim member produced by the present invention is also of high quality since laminated synthetic resin layers are prevented from being peeled off. The forming device itself is small in size since it incorporates the pressurizing means and the suction means therein.

With the covering sheet positioning device, the covering sheet is pressed in close contact with the mold dies by pressers which are aligned with regions of complex shape or narrow regions of the covering sheet. Therefore, the covering sheet can be set in place more easily and reliably than the conventional procedure by which the covering sheet is pressed against the mold dies by fingers of the operator. Since the covering sheet can be set accurately in place against the mold dies even at the narrow regions thereof which cannot be accessed by the fingers of the operator, it is possible to manufacture the trim member which is free of wrinkles and surface displacements and is of high quality.

The covering sheet is attracted to and held by the covering sheet positioning device by the suction means thereof. Therefore, the surface configuration of the covering sheet can be confirmed by the operator before the covering sheet is set in the mold die assembly. This allows the trim member to be manufactured more accurately.

The trim member of the present invention is composed of a covering sheet of synthetic resin and foamed resin bodies laminated on the covering sheet. The foamed resin bodies include a first foamed body having positioning members for positioning a component to be mounted on the trim member and a second foamed body for embedding therein the component which is positioned by the positioning members. Consequently, even if the component to be installed is complex in shape, it can reliably be mounted in place without positional displacement, and the manufacturing process is simplified since the component is not required to be attached later on. Seal members interposed between the component and the first foamed body are effective to prevent leakage of the resin material while it is being foamed. This also results in a trim member of high quality.

Since the component is installed using the foamed resin bodies and resilient seal members, rather than fasteners such as screws, the completed trim member does not produce unwanted squeaking noise which would otherwise be caused by the fasteners as they are loosened.

In addition, the covering sheet which has been substantially shaped to a desired configuration is held in intimate contact with certain shaping members on a product forming surface under the pressure of carbon dioxide generated when the resin material is foamed. The shaping members include a slide core and a recess for forming convex and concave portions of the trim member. Inasmuch as the accuracy of shaping the covering sheet to the desired configuration before additional resin layers are foamed on the covering sheet is not required to be particularly high, the cost of the mold dies for shaping the covering sheet may be reduced. The covering sheet may then be roughly set in the mold die assembly of the forming devices and subsequently be automatically brought into close contact with the female mold die under the pressure of carbon dioxide generated during the foaming process. As a consequence, the covering sheet may be handled with ease when it is to be set in the mold die assembly. A relatively complex product shape can be achieved by the slide core in the female mold member. Different product designs can easily be accomplished by employing different slide cores.

Although certain preferred embodiments have been shown and described, it should be understood that many changes and modifications may be made therein without departing from the scope of the appended claims.

What is claimed is:

1. A method of manufacturing a trim member for use in a motor vehicle, comprising the steps of:
    providing a covering sheet for the trim member having a predetermined shape and including a surface having an embossed pattern;
    forming a first foamed body on said covering sheet wherein a first component is positioned on said covering sheet and embedded partly in said first foamed body, said first component being made of a metallic material, wherein said first foamed body is formed by introducing a first foamable resin into a foaming device having an upper mold die and a lower mold die while said covering sheet is attracted to said lower mold die by a vacuum suction means, said first foamed body having integrally formed therein at least one of the rib and an attachment base for positioning a second component thereon;
    providing a parting agent of said first foamed body during formation thereof;
    blasting the parting agent off said first foamed body after the first foamed body is formed;
    positioning and attaching a second component on at least one of said rib and said attachment base, said second component being made from a resin material;
    forming a second foamed body on at least one of said covering sheet and said first foamed body by introducing a second foamable resin into said forming device after formation of said first foamed body such that said second component becomes positioned and embedded partly in said second foamed body; and
    trimming said second foamed body after the second foamed body is formed;
    wherein said covering sheet comprises a composite sheet material comprising a leather-like resin sheet and a foamed sheet of polyolefin, said resin sheet and said foamed sheet being superposed on each other.

2. The method of manufacturing a trim member according to claim 1, wherein said leather-like resin sheet of said composite sheet is formed of polyvinyl chloride.

3. The method of manufacturing a trim member according to claim 1, wherein said first foamed body is formed of hard urethane foam resin.

4. The method of manufacturing a trim member according to claim 1, wherein said second foamed body is formed of hard urethane foam resin.

5. The method of manufacturing a trim member according to claim 1, wherein said first component of said first foamed body includes a plurality of brackets for forming reinforcements for the trim member.

6. The method of manufacturing a trim member according to claim 1, wherein said second component is an instrument back box.

7. The method of manufacturing a trim member according to claim 1, wherein said second component is a clock box.

8. The method of manufacturing a trim member according to claim 1, wherein said second component is a side duct.

* * * * *